(12) United States Patent
Asada et al.

(10) Patent No.: US 10,812,926 B2
(45) Date of Patent: *Oct. 20, 2020

(54) SOUND OUTPUT DEVICE, SOUND GENERATION METHOD, AND PROGRAM

(71) Applicant: Sony Corporation, Tokyo (JP)

(72) Inventors: Kohei Asada, Kanagawa (JP); Go Igarashi, Tokyo (JP); Koji Nageno, Tokyo (JP); Haruo Oba, Kanagawa (JP); Homare Kon, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/765,365

(22) PCT Filed: Sep. 6, 2016

(86) PCT No.: PCT/JP2016/076145
§ 371 (c)(1),
(2) Date: Apr. 2, 2018

(87) PCT Pub. No.: WO2017/061218
PCT Pub. Date: Apr. 13, 2017

(65) Prior Publication Data
US 2018/0367937 A1    Dec. 20, 2018

(30) Foreign Application Priority Data

Oct. 9, 2015    (JP) .................................. 2015-201000

(51) Int. Cl.
*H04S 7/00*    (2006.01)
*G10L 13/04*    (2013.01)
(Continued)

(52) U.S. Cl.
CPC ............ *H04S 7/303* (2013.01); *G10L 13/043* (2013.01); *G10L 15/22* (2013.01); *H04R 1/1016* (2013.01);
(Continued)

(58) Field of Classification Search
CPC .. H04S 7/303; H04S 2400/11; H04S 2420/01; G10L 13/043; G10L 15/22; H04R 5/04
See application file for complete search history.

(56) References Cited

U.S. PATENT DOCUMENTS 3,068,954 A * 12/1962 Strzalkowski ....... H04R 25/556
                                                          181/135
6,307,943 B1 * 10/2001 Yamagishi ........... H04R 1/1075
                                                          181/132

(Continued)

FOREIGN PATENT DOCUMENTS

CN    103257840 A    8/2013
CN    104041081 A    9/2014
(Continued)

OTHER PUBLICATIONS

International Search Report and English translation thereof dated Nov. 29, 2016 in connection with International Application No. PCT/JP2016/076145.

(Continued)

*Primary Examiner* — Sonia L Gay
(74) *Attorney, Agent, or Firm* — Wolf, Greenfield & Sacks, P.C.

(57) ABSTRACT

According to the present disclosure, a sound output device includes: a sound acquisition part configured to acquire sound to be output to the other end of a sound guide part, one end of which is arranged near an entrance of an ear canal of a listener, the sound guide part having a hollow structure; and a head-related transfer function adjustment part config- (Continued)

ured to adjust a head-related transfer function of sound captured by the sound guide part. Since the head-related transfer function adjustment part adjusts the head-related transfer function of sound captured by the sound guide part, it is possible to listen to both ambient sound and sound provided from a sound output device such that the listener does not feel strangeness even in the state in which the listener is wearing the sound output device.

20 Claims, 35 Drawing Sheets

(51) Int. Cl.
| | | |
|---|---|---|
| *G10L 15/22* | (2006.01) | |
| *H04R 1/10* | (2006.01) | |
| *H04R 3/00* | (2006.01) | |
| *H04R 5/033* | (2006.01) | |
| *H04R 5/04* | (2006.01) | |
| *H04S 3/00* | (2006.01) | |

(52) U.S. Cl.
CPC .............. *H04R 3/00* (2013.01); *H04R 5/033* (2013.01); *H04R 5/04* (2013.01); *H04S 3/004* (2013.01); *H04S 7/304* (2013.01); *H04R 2460/09* (2013.01); *H04S 2400/11* (2013.01); *H04S 2420/01* (2013.01)

(56) References Cited

U.S. PATENT DOCUMENTS

| | | | |
|---|---|---|---|
| 8,204,615 B2 | 6/2012 | Yamada et al. | |
| 8,472,653 B2 | 6/2013 | Kon | |
| 8,503,682 B2 | 8/2013 | Fukui et al. | |
| 8,520,857 B2 | 8/2013 | Fukui et al. | |
| 8,831,231 B2 | 9/2014 | Fukui et al. | |
| 8,873,761 B2 | 10/2014 | Fukui et al. | |
| 9,998,845 B2 | 6/2018 | Shi et al. | |
| 10,171,926 B2 | 1/2019 | Yamamoto et al. | |
| 2003/0185403 A1 | 10/2003 | Sibbald | |
| 2003/0231783 A1* | 12/2003 | Kah, Jr. | H04R 25/652 381/322 |
| 2006/0050908 A1 | 3/2006 | Shteyn et al. | |
| 2008/0118078 A1 | 5/2008 | Asada et al. | |
| 2009/0043411 A1 | 2/2009 | Yamada et al. | |
| 2009/0208022 A1 | 8/2009 | Fukui et al. | |
| 2009/0214045 A1 | 8/2009 | Fukui et al. | |
| 2009/0290718 A1* | 11/2009 | Kahn | H03G 3/32 381/57 |
| 2010/0053210 A1 | 3/2010 | Kon | |
| 2010/0322428 A1 | 12/2010 | Fukui et al. | |
| 2011/0096939 A1* | 4/2011 | Ichimura | H04S 7/304 381/74 |
| 2011/0286601 A1 | 11/2011 | Fukui et al. | |
| 2011/0305358 A1 | 12/2011 | Nishio et al. | |
| 2013/0041648 A1 | 2/2013 | Osman | |
| 2013/0287235 A1 | 10/2013 | Fukui et al. | |
| 2014/0025287 A1* | 1/2014 | Christensen | G01C 21/3629 701/409 |
| 2014/0205111 A1 | 7/2014 | Hatanaka et al. | |
| 2015/0067187 A1* | 3/2015 | Glasser | H04L 65/60 709/231 |
| 2015/0181355 A1* | 6/2015 | Pedersen | H04R 25/407 381/313 |
| 2015/0222977 A1* | 8/2015 | Angel, Jr. | H04R 1/105 381/74 |
| 2015/0264469 A1 | 9/2015 | Murata et al. | |
| 2015/0382127 A1* | 12/2015 | Sun | H04S 7/30 381/17 |
| 2016/0080883 A1 | 3/2016 | Yamamoto et al. | |
| 2016/0134958 A1* | 5/2016 | Thompson | H04R 1/105 381/381 |
| 2016/0165374 A1 | 6/2016 | Shi et al. | |
| 2016/0277837 A1* | 9/2016 | Sato | H04R 1/1041 |
| 2018/0184222 A1 | 6/2018 | Yamamoto et al. | |

FOREIGN PATENT DOCUMENTS

| | | |
|---|---|---|
| CN | 104078050 A | 10/2014 |
| CN | 104079247 A | 10/2014 |
| CN | 104604257 A | 5/2015 |
| CN | 104918177 A | 9/2015 |
| EP | 421681 A2 | 4/1991 |
| EP | 2 685 217 A1 | 1/2014 |
| EP | 2 804 402 A1 | 11/2014 |
| JP | 03-117999 A | 5/1991 |
| JP | 2003-526122 A | 9/2003 |
| JP | 2006-509439 A | 3/2006 |
| JP | 2008-131089 A | 6/2008 |
| JP | 2011-097268 A | 5/2011 |
| JP | 4709017 B2 | 6/2011 |
| JP | 2015-080087 A | 4/2015 |
| JP | 2015-173369 A | 10/2015 |
| WO | WO 2004/054313 A2 | 6/2004 |
| WO | WO 2014/160678 A2 | 10/2014 |
| WO | WO 2015/068756 A1 | 5/2015 |

OTHER PUBLICATIONS

Written Opinion and English translation thereof dated Nov. 29, 2016 in connection with International Application No. PCT/JP2016/076145.

International Preliminary Report on Patentability and English translation thereof dated Apr. 19, 2018 in connection with International Application No. PCT/JP2016/076145.

Extended European Search Report dated May 20, 2019 in connection with European Application No. 16853372.7.

Chinese Office Action dated Mrch 19, 2020 in connection with Chinese Application No. 201680057546.8, and English translation thereof.

Extended European Search Report dated Apr. 29, 2020 in connection with European Application No. 19211402.3.

European Communication pursuant to Article 94(3) EPC dated Jun. 3, 2020 in connection with European Application No. 16 853 372.7.

* cited by examiner

FIG. 8
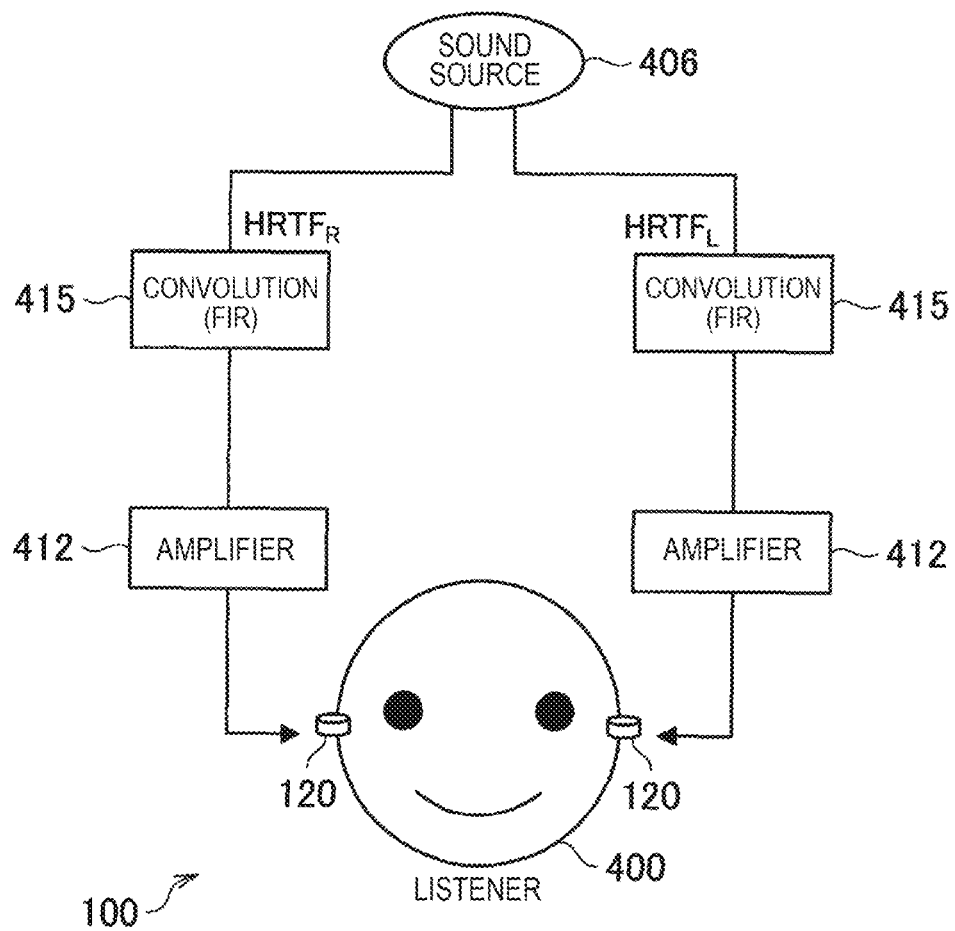
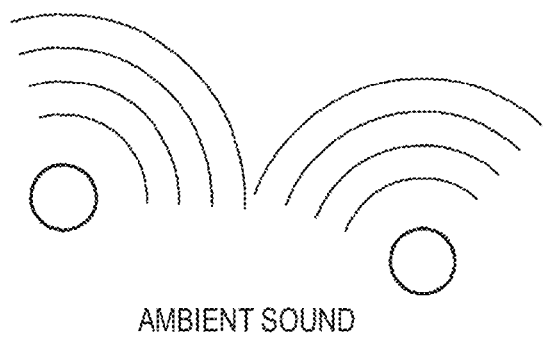

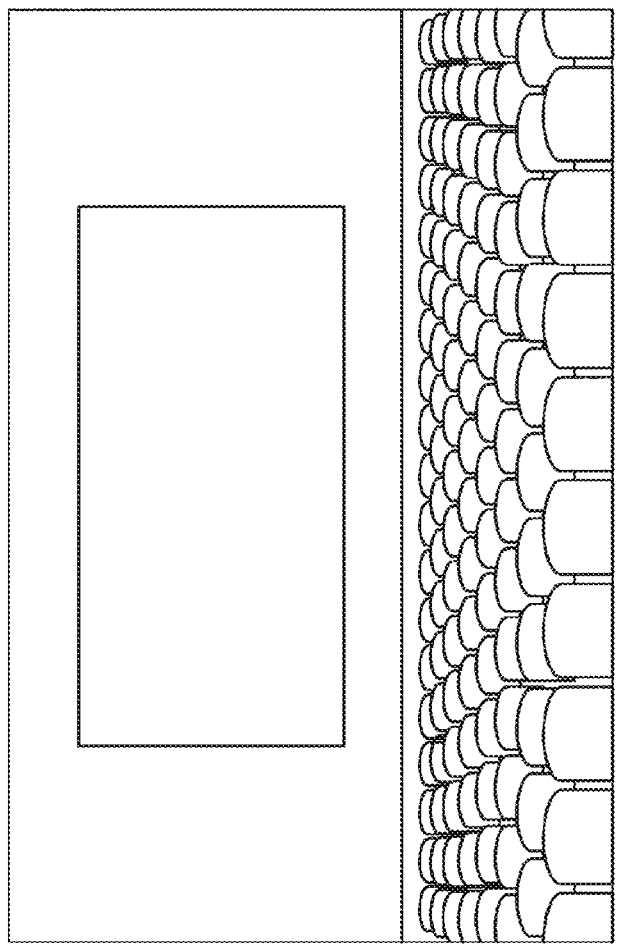
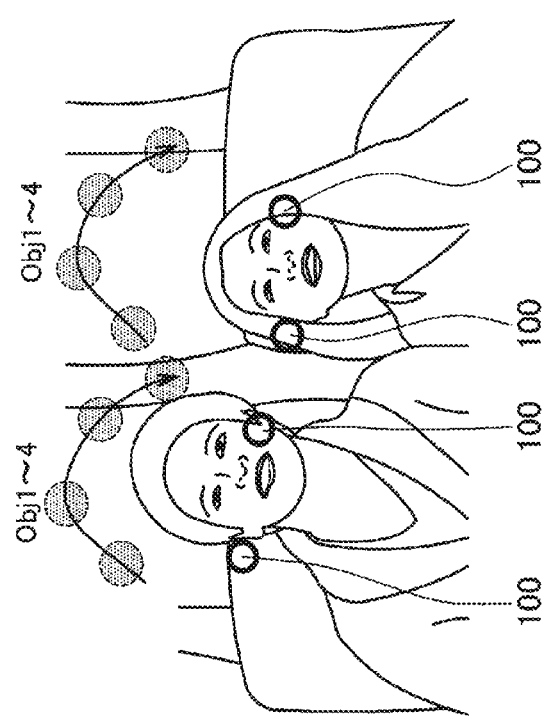
FIG. 38

SOUND OUTPUT DEVICE, SOUND GENERATION METHOD, AND PROGRAM

TECHNICAL FIELD

This Application is a national stage filing under 35 U.S.C. 371 of International Patent Application Serial No. PCT/JP2016/076145, filed Sep. 6, 2016, entitled "SOUND OUTPUT DEVICE, SOUND GENERATION METHOD, AND PROGRAM", which claims priority under 35 U.S.C. § 119(a)-(d) or 35 U.S.C. § 365(b) to Japanese application number 2015-201000, filed Oct. 9, 2015, the entire contents of each of which are incorporated herein by reference in their entireties.

The present disclosure relates to sound output devices, sound generation methods, and programs.

BACKGROUND ART

According to related arts, small earphones configured to convert electrical signals output from reproduction devices or the like into sound signals through speakers have been widespread. Such earphones emit sound such that the sound is heard only by a listener wearing the earphones. Therefore, such earphones have been used in various kinds of environments.

Such earphones have forms that allow the earphones to be inserted into ears of listeners. For example, in-ear earphones have forms that allow users to use the earphones by inserting the earphones deeply into their ears (ear canals). Because of their structure, most of in-ear earphones have open designs. Such earphones have relatively good noise isolation performances, and therefore such earphones have advantage that users can enjoy music or the like even in places with slightly large noise.

In general, in-ear earphone has a speaker unit and housing as basic structural elements. The speaker unit is configured to convert electrical signals into sound signals. The housing has a substantially cylindrical shape, and the housing also serves as a sound tube. The speaker unit is attached on one end of the housing (outer side of ear canal). The housing has an emission outlet through which vibrating air generated in the speaker unit is emitted to an ear canal and transmitted to an eardrum. In addition, in general, an ear tip (removable part) is attached to the other end of the housing (part to be inserted into ear canal). The ear tip has a shape that fits a listener's ear canal when worn by the listener. For example, Patent Literature 1 proposes an in-ear earphone device in which a sound tube is arranged to tilt from a position other than the center of housing such that the housing fits into a concha auriculae and the sound tube is arranged close to an entrance of an ear canal.

CITATION LIST

Patent Literature

Patent Literature 1: JP 4709017B

DISCLOSURE OF INVENTION

Technical Problem

Even in the case where a listener is wearing earphones and listening to provided sound, the listener has to listen to ambient sound at the same time if a person around the listener speaks to the listener, for example. However, with regard to most of conventional earphones such as in-ear earphones, it is extremely difficult for a listener to listen to ambient sound while wearing the earphones. This is because such earphones have structures that completely cover ear openings to improve reproduction sound quality and to prevent a reproduction sound from leaking to the outside. For example, listeners may feel inconvenience if they cannot listen to ambient sound during driving, being navigated, or doing outdoor or indoor sports such as walking, jogging, cycling, mountaineering, skiing, or snowboarding. In addition, in such a situation, the listeners may encounter dangerous situations. In addition, convenience may deteriorate if listeners cannot hear ambient sound during communication or a presentation. In addition, when a listener is wearing the conventional earphones, people around the listener can see earphones covering ear openings of the listener. Therefore, the people around the listener wearing the earphones may hesitate to speak to the listener, and this may interrupt communication between people.

In view of such circumstances, it is desirable to listen to both ambient sound and sound provided from a sound output device such that a listener does not feel strangeness even in the state in which the listener is wearing the sound output device.

Solution to Problem

According to the present disclosure, there is provided a sound output device including: a sound acquisition part configured to acquire sound to be output to the other end of a sound guide part, one end of which is arranged near an entrance of an ear canal of a listener, the sound guide part having a hollow structure; and a head-related transfer function adjustment part configured to adjust a head-related transfer function of sound captured by the sound guide part.

The sound output device according may further include a sound environment adjustment part configured to adjust a sound environment of sound captured by the sound guide part.

In addition, the head-related transfer function adjustment part may change the head-related transfer function such that a sound image of the sound is localized at a place different from a place of ambient sound directly entering an ear of a listener.

In addition, the head-related transfer function adjustment part may change the head-related transfer function such that a sound image of the sound is localized above a head of the listener or near a foot of the listener.

In addition, the head-related transfer function adjustment part may adjust the head-related transfer function on a basis of operation performed by a listener.

In addition, the sound environment adjustment part may adjust the sound environment on a basis of operation performed by a listener.

In addition, the sound environment adjustment part may adjust the sound environment on a basis of sound information of an ambient environment of the listener.

In addition, the sound environment adjustment part may adjust the sound environment on a basis of a result of separating the sound information of the ambient environment into human voice and environmental sound other than the human voice.

In addition, the sound environment adjustment part may acquire a result of analyzing sound information of an ambient environment of the listener from another device, and adjust the sound environment.

In addition, the sound environment adjustment part may adjust the sound environment on a basis of location information of a listener.

In addition, the head-related transfer function adjustment part may adjust the head-related transfer function on a basis of a direction of a head of a listener.

In addition, the head-related transfer function adjustment part may adjust a head-related transfer function such that a sound image location is a constant location regardless of a direction of a head of a listener.

In addition, the sound output device may include a sound output part configured to output sound to be transmitted to an ear of the listener without passing through the sound guide part.

In addition, one of sound to be output to the sound guide part and sound to be transmitted to an ear of the listener without passing through the sound guide part may be delayed.

In addition, the sound output device may include a delay part configured to delay sound to be transmitted to an ear of the listener without passing through the sound guide part in comparison with sound to be output to the sound guide part.

In addition, the sound output device may include a location information acquisition part configured to acquire location information of a listener, and the sound acquisition part may acquire navigation information based on the location information.

In addition, the sound acquisition part may acquire speech of the listener or voice for giving an instruction on movement of the listener.

In addition, the sound acquisition part may acquire guidance information for explaining any event visually recognized by the listener in a language designated by the listener from among a plurality of languages.

In addition, according to the present disclosure, there is provided a sound generation method including: acquiring sound to be output to the other end of a sound guide part, one end of which is arranged near an entrance of an ear canal of a listener, the sound guide part having a hollow structure; and adjusting a head-related transfer function of sound captured by the sound guide part.

In addition, according to the present disclosure, there is provided a program causing a computer to function as: a means for acquiring sound to be output to the other end of a sound guide part, one end of which is arranged near an entrance of an ear canal of a listener, the sound guide part having a hollow structure; and a means for adjusting a head-related transfer function of sound captured by the sound guide part.

Advantageous Effects of Invention

As described above, according to the present disclosure, it is possible to listen to both ambient sound and sound provided from a sound output device such that the listener does not feel strangeness even in the state in which the listener is wearing the sound output device.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 8 is a schematic diagram illustrating an example of applying the sound output device according to the embodiment to the system illustrated in FIG. 6.

FIG. 14 is a schematic diagram illustrating a system of giving an instruction to a presentation speaker from an outside during a presentation or the like.

FIG. 38 is a schematic diagram illustrating an application example in a movie theater.

MODE(S) FOR CARRYING OUT THE INVENTION

Figure 1:
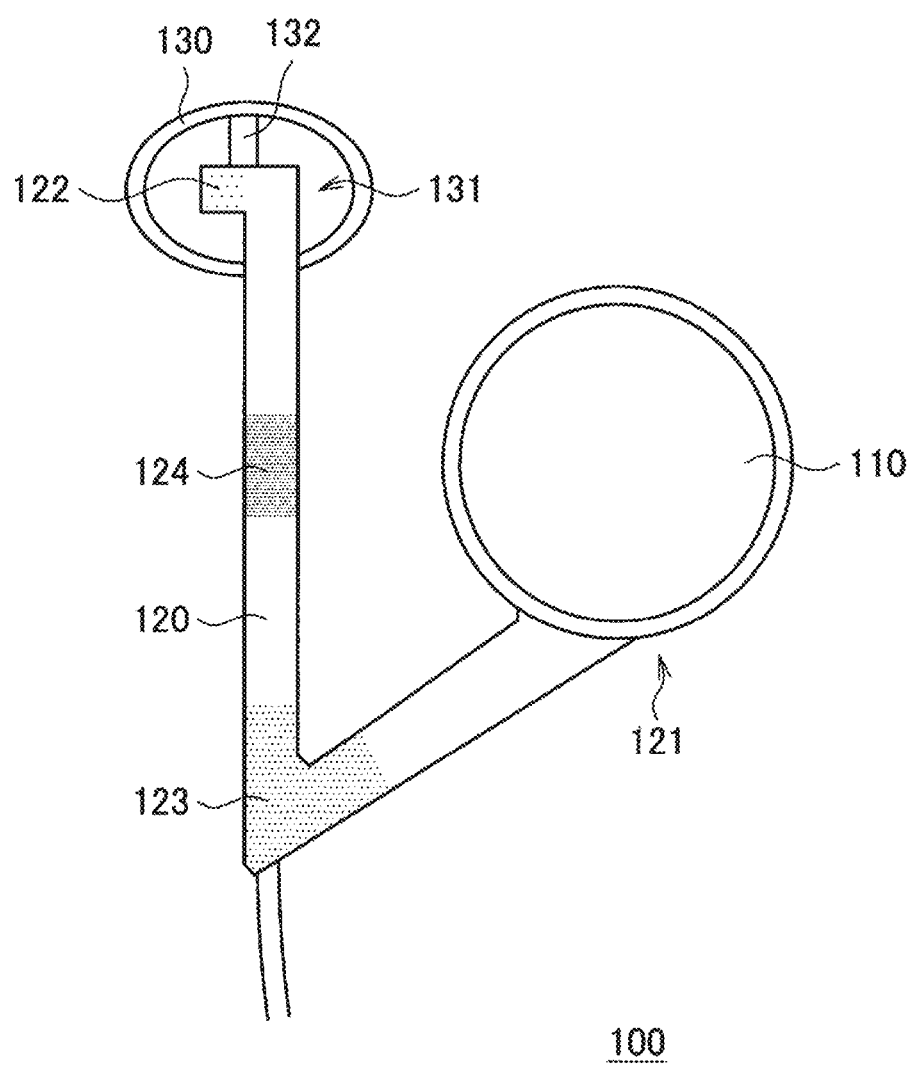
FIG. 1 is a schematic diagram illustrating a configuration of a sound output device according to an embodiment of the present disclosure.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Figure 2:
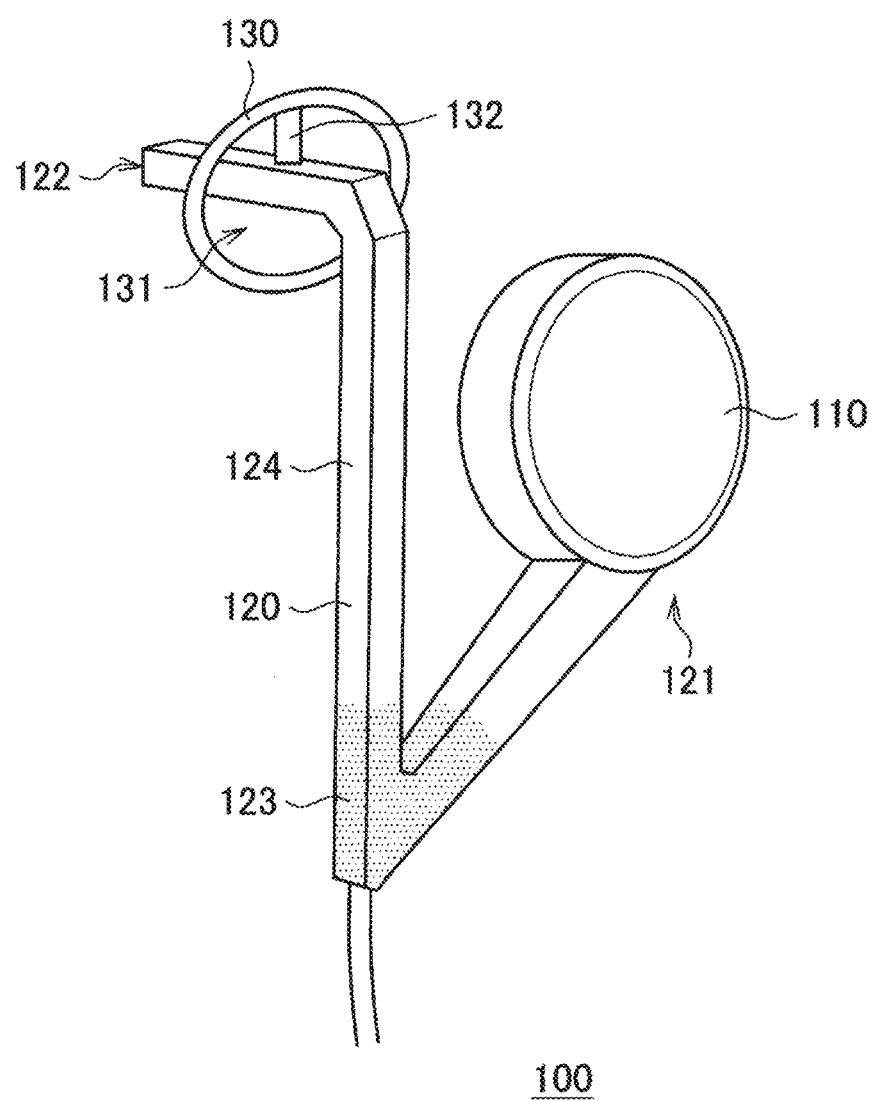
FIG. 2 is a schematic diagram illustrating the configuration of the sound output device according to the embodiment of the present disclosure.

Note that, the description is given in the following order.
1. Configuration Example of Sound Output Device
1. Configuration Example of Sound Output Device First, with reference to FIG. 1, a schematic configuration of a sound output device according to an embodiment of the present disclosure will be described. FIG. 1 and FIG. 2 are schematic diagrams illustrating a configuration of a sound output device 100 according to the embodiment of the present disclosure. Note that, FIG. 1 is a front view of the sound output device 100, and FIG. 2 is a perspective view of the sound output device 100 when viewed from the left side. The sound output device 100 illustrated in FIG. 1 and FIG. 2 is configured to be worn on a left ear. A sound output device (not illustrated) to be worn on a right ear is configured such that the sound output device to be worn on a right ear is a mirror image of the sound output device to be worn on a left ear.

The sound output device 100 illustrated in FIG. 1 and FIG. 2 includes a sound generation part 110, a sound guide part 120, and a supporting part 130. The sound generation part 110 is configured to generate sound. The sound guide part 120 is configured to capture the sound generated by the sound generation part 110 through one end 121. The supporting part 130 is configured to support the sound guide part 120 near the other end 122. The sound guide part 120 includes hollow tube material having an internal diameter of 1 to 5 mm. Both ends of the sound guide part 120 are open ends. The one end 121 of the sound guide part 120 is a sound input hole for sound generated by the sound generation part 110, and the other end 122 is a sound output hole for that sound. Therefore, one side of the sound guide part 120 is open since the one end 121 is attached to the sound generation part 110.

As described later, the supporting part 130 fits to a vicinity of an opening of an ear canal (such as intertragic notch), and supports the sound guide part 120 near the other end 122 such that the sound output hole at the other end 122 of the sound guide part 120 faces deep in the ear canal. The outside diameter of the sound guide part 12 near at least the other end 122 is much smaller than the internal diameter of the opening of the ear canal. Therefore, the other end 122 does not completely cover the ear opening of the listener even in the state in which the other end 122 of the sound guide part 120 is supported by the supporting part 130 near the opening of the ear canal. In other words, the ear opening is open. The sound output device 100 is different from conventional earphones. The sound output device 100 can be referred to as an 'ear-open-style' device.

In addition, the supporting part 130 includes an opening part 131 configured to allow an entrance of an ear canal (ear opening) to open to the outside even in a state in which the sound guide part 120 is supported by the supporting part 130. In the example illustrated in FIG. 1 and FIG. 2, the supporting part 130 has a ring-shaped structure, and connects with a vicinity of the other end 122 of the sound guide part 120 via a stick-shaped supporting member 132 alone. Therefore, all parts of the ring-shaped structure other than them are the opening part 131. Note that, as described later, the supporting part 130 is not limited to the ring-shaped structure. The supporting part 130 may be any shape as long as the supporting part 130 has a hollow structure and is capable of supporting the other end 122 of the sound guide part 120.

The tube-shaped sound guide part 120 captures sound generated by the sound generation part 110 into the tube from the one end 121 of the sound guide part 120, propagates air vibration of the sound, emits the air vibration to an ear canal from the other end 122 supported by the supporting part 130 near the opening of the ear canal, and transmits the air vibration to an eardrum.

As described above, the supporting part 130 that supports the vicinity of the other end 122 of the sound guide part 130 includes the opening part 131 configured to allow the opening of an ear canal (ear opening) to open to the outside. Therefore, the sound output device 100 does not completely cover an ear opening of a listener even in the state in which the listener is wearing the sound output device 100. Even in the case where a listener is wearing the sound output device 100 and listening to sound output from the sound generation part 110, the listener can sufficiently hear ambient sound through the opening part 131.

Note that, although the sound output device 100 according to the embodiment allows an ear opening to open to the outside, the sound output device 100 can suppress sound generated by the sound generation part 100 (reproduction sound) from leaking to the outside. This is because the sound output device 100 is worn such that the other end 122 of the sound guide part 120 faces deep in the ear canal near the opening of the ear canal, air vibration of generated sound is emitted near the eardrum, and this enables good sound quality even in the case of reducing output from the sound output part 100.

Figure 3:
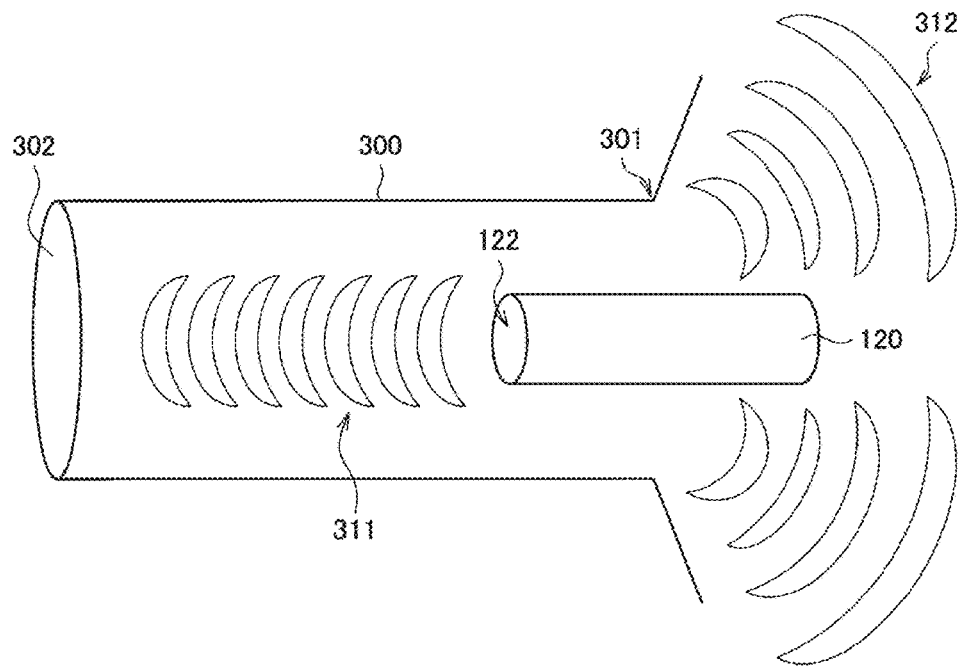
FIG. 3 is a schematic diagram illustrating a situation in which an ear-open-style sound output device outputs sound waves to an ear of a listener.

In addition, directivity of air vibration emitted from the other end 122 of the sound guide part 120 also contributes to prevention of sound leakage. FIG. 3 illustrates a situation in which the ear-open-style sound output device 100 outputs sound waves to an ear of a listener. Air vibration is emitted from the other end 122 of the sound guide part 120 toward the inside of an ear canal. An ear canal 300 is a hole that starts from the opening 301 of the ear canal and ends at an eardrum 302. In general, the ear canal 300 has a length of about 25 to 30 mm. The ear canal 300 is a tube-shaped closed space. Therefore, as indicated by a reference sign 311, air vibration emitted from the other end 122 of the sound part 120 toward deep in the ear canal 300 propagates to the eardrum 302 with directivity. In addition, sound pressure of the air vibration increases in the ear canal 300. Therefore, sensitivity to low frequencies (gain) improves. On the other hand, the outside of the ear canal 300, that is, an outside world is an open space. Therefore, as indicated by a reference sign 312, air vibration emitted to the outside of the ear canal 300 from the other end 122 of the sound guide part 120 does not have directivity in the outside world and rapidly attenuates.

Returning to the description with reference to FIG. 1 and FIG. 2, an intermediate part of the tube-shaped sound guide part 120 has a curved shape from the back side of an ear to the front side of the ear. The curved part is a clip part 123 having an openable-and-closable structure, and is capable of generating pinch force and sandwiching an earlobe. Details thereof will be described later.

In addition, the sound guide part 120 further includes a deformation part 124 between the curved clip part 123 and the other end 122 that is arranged near an opening of an ear canal. When excessive external force is applied, the deformation part 124 deforms such that the other end 122 of the sound guide part 120 is not inserted into deep in the ear canal too much.

When using the sound output device 100 having the above-described configuration, it is possible for a listener to naturally hear ambient sound even while wearing the sound output device 100. Therefore, it is possible for the listener to fully utilize his/her functions as human beings depending on his/her auditory property, such as recognition of spaces, recognition of dangers, and recognition of conversations and subtle nuances in the conversations.

As described above, in the sound output device 100, the structure for reproduction does not completely cover the vicinity of the opening of an ear. Therefore, ambient sound is acoustically transparent. In a way similar to environments of a person who does not wear general earphones, it is possible to hear ambient sound as it is, and it is also possible to hear both the ambient sound and sound information or music simultaneously by reproducing desired sound information or music through its pipe or duct shape.

Basically, in-ear earphones that have been widespread in recent years have closed structures that completely cover ear canals. Therefore, user hears his/her own voice and chewing sound in a different way from a case where his/her ear canals are open to the outside. In many case, this causes users to feel strangeness and uncomfortable. This is because own vocalized sound and chewing sound are emitted to closed ear canals though bones and muscles. Therefore, low frequencies of the sound are enhanced and the enhanced sound propagates to eardrums. When using the sound output device 100, such phenomenon never occurs. Therefore, it is possible to enjoy usual conversations even while listening to desired sound information.

On the other hand, although users can simultaneously hear both actual sound in an ambient environment and necessary sound information reproduced by the sound output device 100 (such as music or information sound from a radio or a network), these sounds may interrupt each other. In addition, the ambient environmental sound is naturally 'heard in the same way as usual'. Therefore, sound sources are localized with appropriate senses of distance. However, when reproduction sound information or reproduction music is reproduced near ear canals in a way similar to a case of using general earphones, sound images have close distances and lateralization occurs. In a similar way, sound images also have close distances and lateralization occurs in the case of listening to reproduction sound information or reproduction music in a stereo state. As described above, when simultaneously listening to both ambient environmental sound and reproduction sound information or the like in the case where senses of distance between them are different from 'results of listening', sometimes 'listening fatigue' occurs and it takes a while to recognize content of the sound. For example, in the case where an alarm is ringing in an ambient environmental sound while listening to music, sometimes it takes a while to change the target to be aurally focused on.

Therefore, according to the embodiment of the present disclosure, it is possible to solve such problems by creating a phenomenon known as the so-called 'cocktail party effect' as a system. There are various theories as to a principle of the cocktail party effect. One of the theories is that, it is possible to distinguish different pieces of sound image location information since it is possible to specially recognize the pieces of sound image location information in a three-dimensional space in one's head. For example, it is difficult to separate and distinguish conversations of people when reproducing content in which conversations in a conference are recorded through a monaural microphone. However, it is possible to separate and distinguish conversations when using headphones for reproducing content in which conversations in a conference are recorded through binaural recording.

In other words, although sound information, music, or the like is reproduced as it is by the sound output device 100 near ear canals of ears, sound images are localized at artefactual locations by using signal processing. It is possible to reduce listening fatigue of users by providing sound sources that fits an ambient sound environment or by providing sound sources as if the sound sources are in a natural space. In addition, it is possible to selectively listen to ambient environmental sound and reproduction sound information depending on a sound image map recognized by a user (in his/her head) without paying attention to transition time and listening fatigue.

Such sound image localization can be referred to as 'audio augmented reality' (AR) that applies the AR technology that is generally popular in a field of video to a field of audio. In addition, it is also considered that reproduction sound information is overlaid on ambient sound. The embodiment of the present disclosure also describes new UX in addition to a system focusing on solving the above-described problem.

Figure 4:
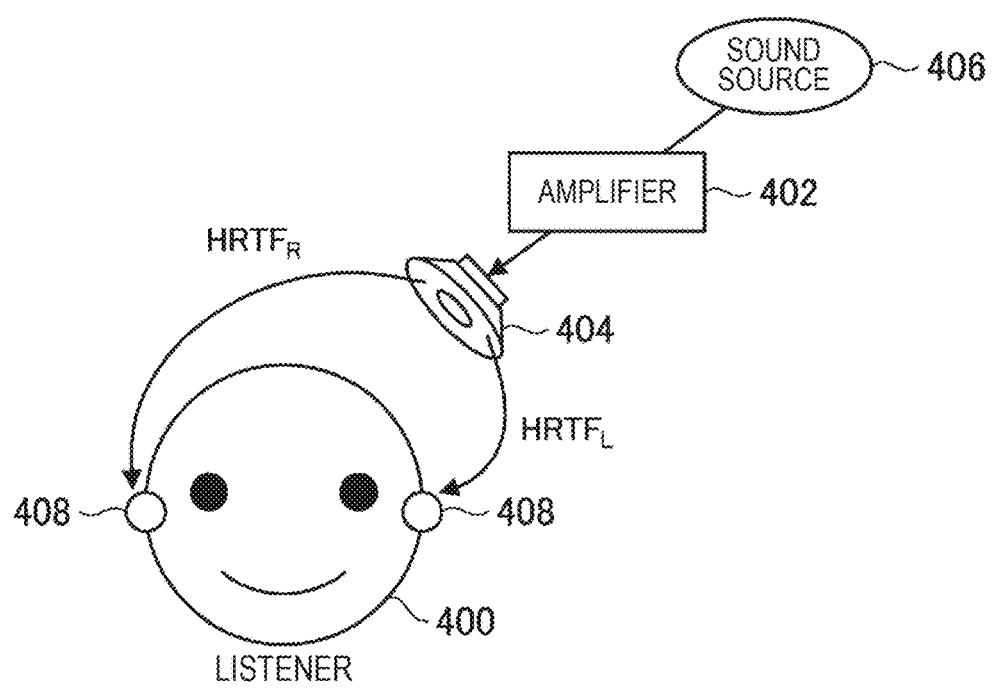
FIG. 4 is a schematic diagram illustrating a method of virtually localizing a sound image by using headphones (earphones), which is a principle of the embodiment.
Figure 5:
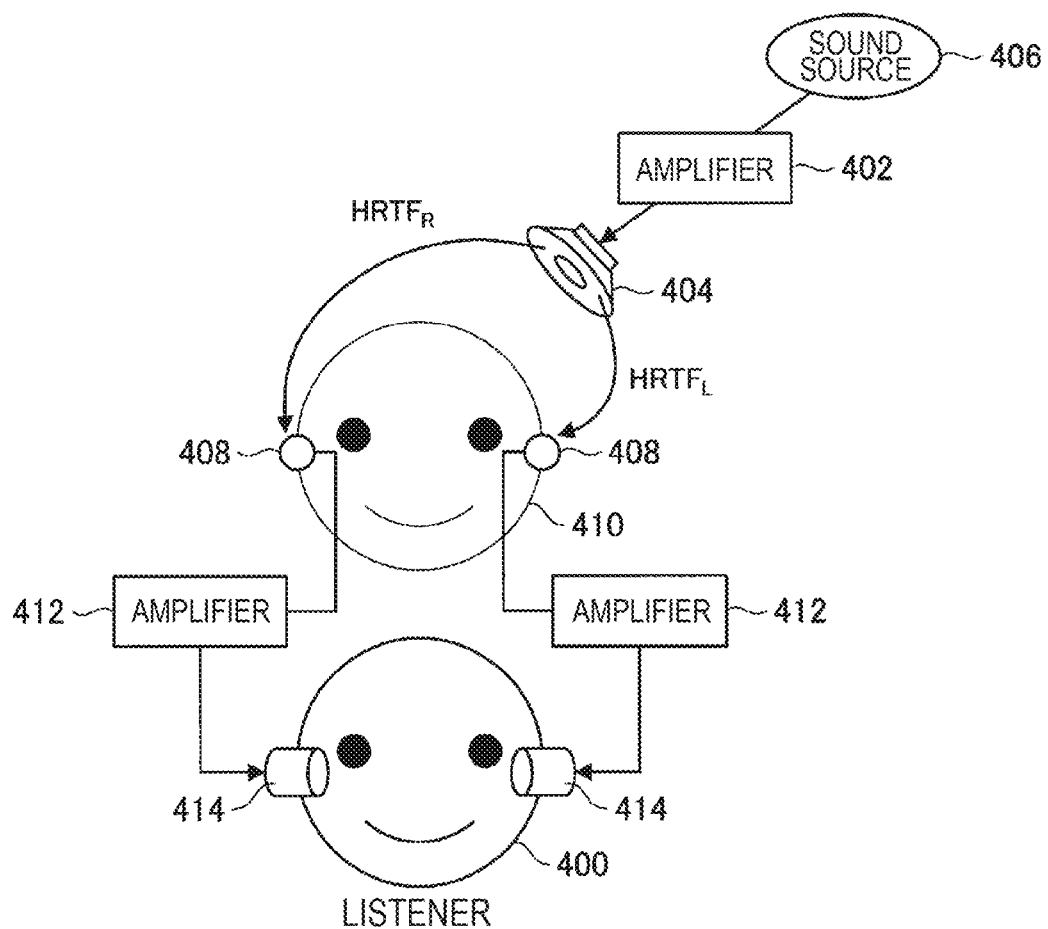
FIG. 5 is a schematic diagram illustrating a method of virtually localizing a sound image by using headphones (earphones), which is a principle of the embodiment.

FIG. 4 and FIG. 5 are schematic diagrams illustrating methods of virtually localizing a sound image by using headphones (earphones), which is a principle of the embodiment. FIG. 4 illustrates a case where sound of a sound source 406 is presented to a person 400 via an amplifier 402 and a speaker 404. In this case, the person 400 listens to the sound of the sound source through microphones 408 arranged at his/her ears by using head-related transfer functions (hereinafter, also referred to as HRTFs) to the ears. The sound listened through the microphones 408 corresponds to sound listened by the both ears. Human beings rely on the sound listened through both ears and estimates locations of sound sources mainly from past experience.

As illustrated in FIG. 5, in the case of collecting sound of the sound source 406 via a dummy head 410 with microphones 408 and reproducing the collected sound via amplifiers 412 in a way similar to FIG. 4, the person 400 can listen to the sound similar to FIG. 4 through earphones 414 worn on his/her ears. This sound corresponds to reproduction of sound recorded through the above-described binaural recording. The head-related transfer function corresponds to transfer characteristics from the location of the sound source 406 to an ear of the listener. Note that, in the binaural recording and reproduction, it is necessary to correct characters of the microphones and the headphones in a precise sense.

Figure 6:
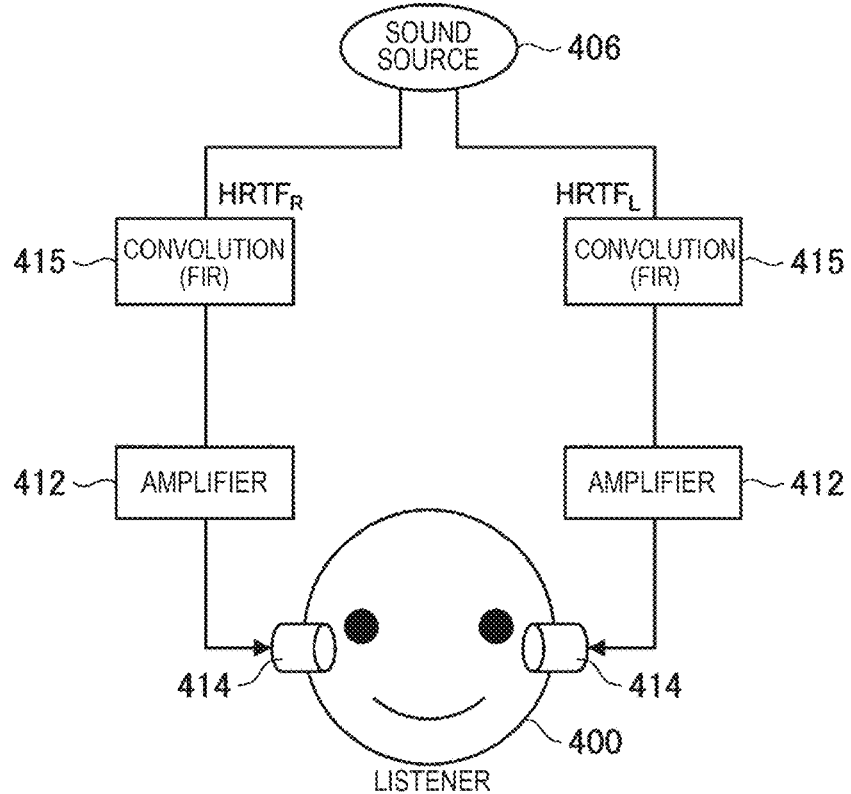
FIG. 6 is a schematic diagram illustrating a basic configuration using signal processing for acquiring sound image localization corresponding to FIG. 4 and FIG. 5.

FIG. 6 illustrates a basic configuration using signal processing for acquiring sound image localization corresponding to FIG. 4 and FIG. 5. By convolving the HRTF of a desired sound image location for each ear with regard to the sound source 406 (monaural dry source) on the time axis using an MPU or a DSP, it is possible to localize a sound image at any location.

Figure 7:
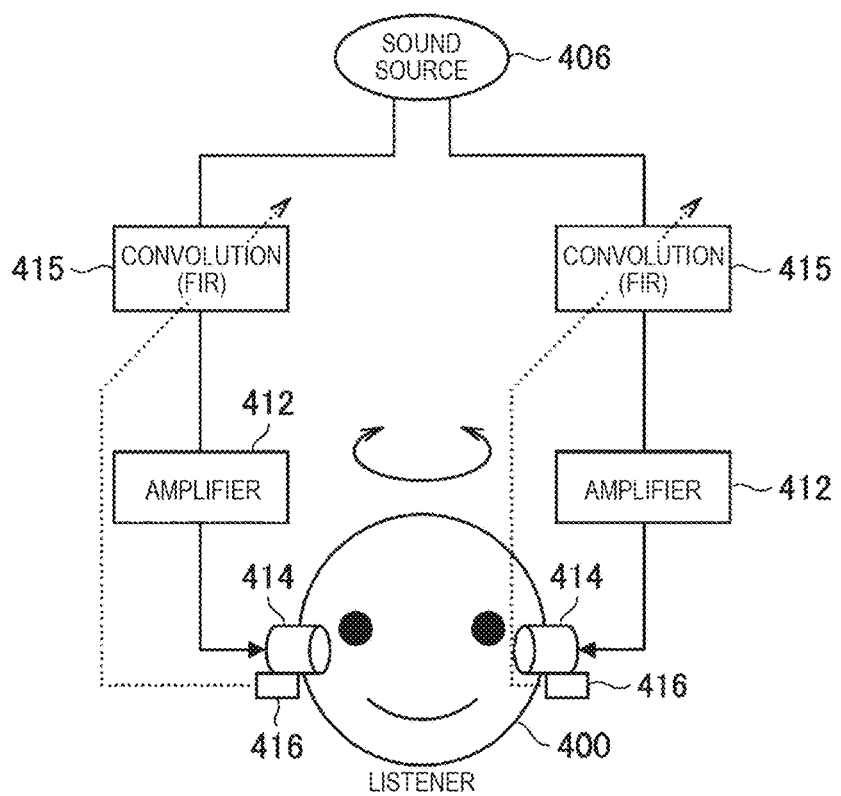
FIG. 7 is a schematic diagram illustrating a system in which the earphones include sensors such as acceleration sensors and gyro sensors in addition to structural elements illustrated in FIG. 6, positions of the sensors are fixed with respect to the head of a listener, and HRTF filtering processes change in response to horizontal and vertical rotation of the head.

FIG. 7 is a system in which the earphones 414 include sensors 416 such as acceleration sensors and gyro sensors in addition to structural elements illustrated in FIG. 6, positions of the sensors 416 are fixed with respect to the head of the person 400, and processes of HRTF filters 415 change in response to horizontal and vertical rotation of the head. Accordingly, even when a listener rotates his/her head, it is possible to prevent a recognition location of the sound image localization in a space from changing, by adjusting the processes of the HRTF filters in response to rotation of the head. Therefore, it is possible for the listener to feel the sound image localization of the sound source 406 more realistically.

FIG. 8 is a schematic diagram illustrating an example of applying the sound output device 100 according to the embodiment to the system illustrated in FIG. 6. More specifically, in FIG. 8, the sound output device 100 is used, and the sound guide parts 120 are inserted into ears of the listener (person 400) instead of the earphones 414. As illustrated in FIG. 8, the system illustrated in FIG. 6 is applied to the 'ear-open-style device', according to the basic configuration of the embodiment. In this case, it is possible to localize sound source information of the sound source 406 in a virtual space by convoluting the HRTFs while keeping the listener (person 400) to hear the ambient sound as it is. Therefore, it is possible to spatially localize the sound source 406 as if the sound information exists in a space same as the real. In addition, it is possible to localize the sound information of the sound source 406 in the virtual space by convoluting the HRTFs. Therefore, it is possible to reproduce the sound as if a virtual speaker reproduces the sound source 406. It is possible for the sound generation part 110 of the sound output device 100 to include the respective structural elements such as the sound source 406, the filters 415, and the amplifier 412 illustrated in FIG. 8. In addition, such structural elements in FIG. 8 can be configured by a circuit (hardware) or a central processing part such as a CPU and a program (software) for causing it to function.

As illustrated in the configuration example in FIG. 8, the sound output device 100 according to the present disclosure basically includes: a sound acquisition part configured to acquire sound to be output to the other end of a sound guide part whose one end is arranged near an entrance of an ear canal of a listener, the sound guide part having a hollow structure; and a head-related transfer function adjustment part configured to adjust a head-related transfer function of sound captured by the sound guide part. In the configuration illustrated in FIG. 8, the 'sound acquisition part' according to the present disclosure corresponds to the filter 415. In addition, the 'head-related transfer function adjustment part' according to the present disclosure corresponds to the filter 415 and a sound image location control part 424.

In the configuration example in FIG. 8, the HRTFs are convoluted through the filters 415, in a way similar to FIG. 6. By using a known technique, the transfer characteristics from the location of the sound source 406 to ears of a listener are convoluted through the filters 415, and it is possible to localize a sound image at any location. Here, $\text{HRTF}_L$ represents a head-related transfer function of a path from the sound source 406 to the left ear of the listener, and $\text{HRTF}_R$ represents a head-related transfer function of a path from the sound source 406 to the right ear of the listener. In the case where the convolution is not performed on the HRTFs, sound presented by the sound output device 100 is heard in one's head. In the case where the convolution is performed on the HRTFs, it is possible to hear the sound outside the head. Accordingly, it is possible to hear both ambient sound and sound presented by the sound output device 100 as sound outside the head. Therefore, it is possible for a user to listen to the ambient sound and the sound presented by the sound output device 100 such that the listener does not feel strangeness. Note that, it is also possible to implement FIR filters as the HRTF filters 415. In addition, it is also possible to implement filters approximated by computation on a frequency axis or combination of IIRs, as the HRTF filters 415.

Figure 9:
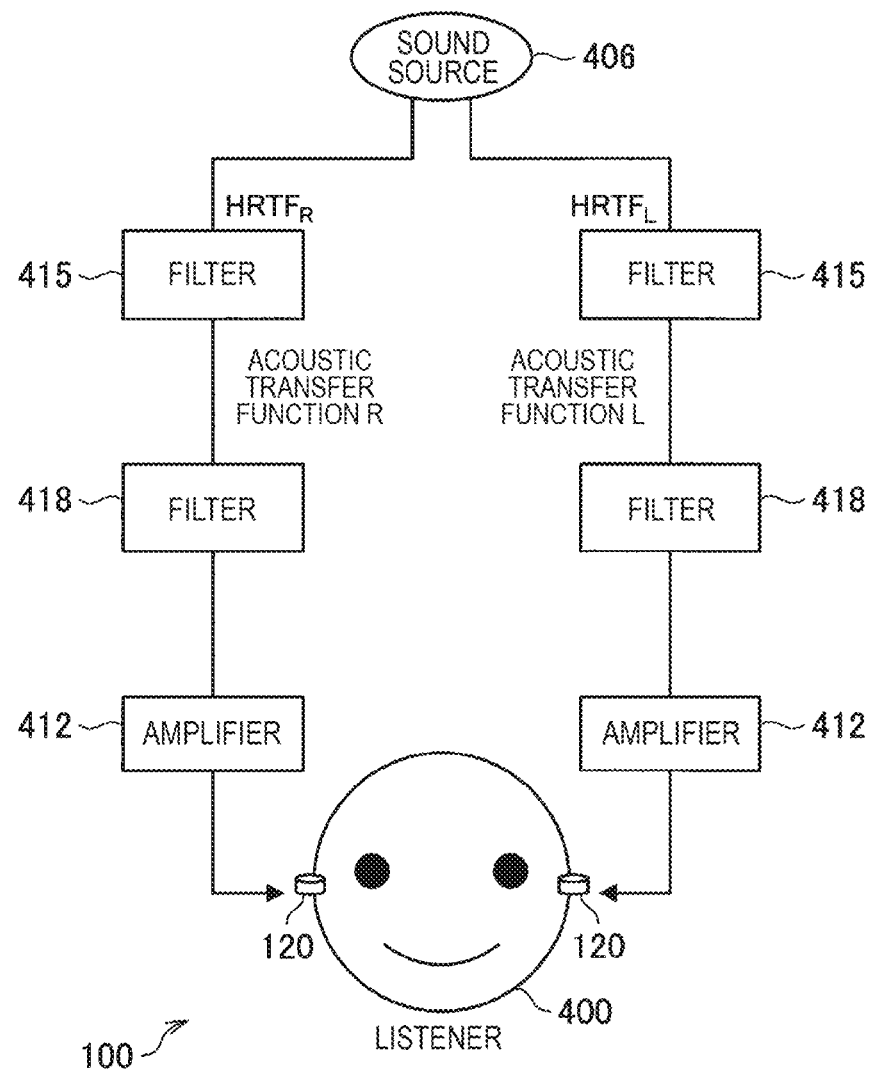
FIG. 9 is a schematic diagram illustrating a configuration of convolving acoustic transfer functions L and R through filters to localize a sound source as a sound image in an ambient environment during reproduction.

In general, most of the HRTFs are measured in an anechoic chamber or a room with less reverberation. By convoluting the HRTFs and sound of the sound source 406 through the filters 415, it is possible for the person 400 to recognize an approximate direction of the sound source 406 and an approximate distance to the sound source 406, and it is possible to localize a sound image. In addition, according to the embodiment, acoustic transfer functions L and R are convoluted through filters 418 to blend the sound source 406 in an ambient environment as a sound image during reproduction, as illustrated in FIG. 9. The acoustic transfer functions L and R mainly include information regarding reflection sound and reverberation. Ideally, it is desirable to use a transfer function (impulse response) between appropriate two points (for example, between location of virtual speaker and location of ear) on an assumption of an actual reproduction environment or an environment similar to the actual reproduction environment. Note that it is possible to improve reality of the sound environment by defining the acoustic transfer functions L and R as different functions, for example, by way of selecting a different set of the two points for each of the acoustic transfer functions L and R, even if the acoustic transfer functions L and R are in the same environment.

Figure 10:
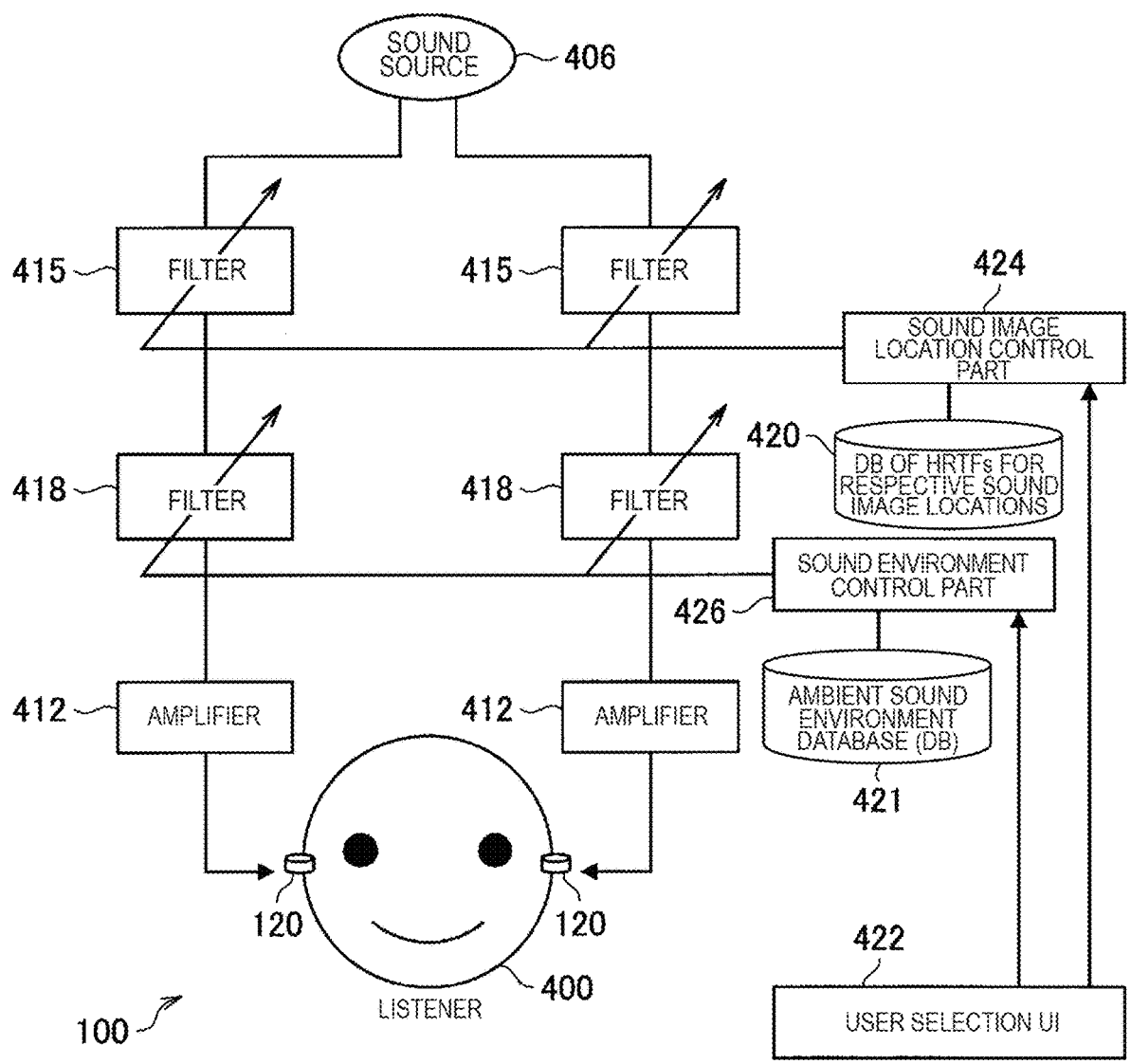
FIG. 10 is a schematic diagram illustrating an actual application example of the system illustrated in FIG. 9.

In a case of actual application of the system illustrated in FIG. 9, a user selects a location of the sound image localization and a type of the sound environment from databases 420 and 241 through a user interface (UI) 422, as illustrated in FIG. 10. The database 420 and 421 store a plurality of filters. Examples of the UI 422 includes a switch provided on the sound output device 100, screen (touchscreen) of a smartphone or the like wirelessly cooperating with the sound output device 100, and the like.

The sound image location control part 424 controls a sound image location of the sound source 406 in response to operation performed on the UI 422. In this case, an optimal filter is selected from the database 420 in response to the operation performed on the UI 422. In addition, the sound environment control part 426 controls sound of the sound source 406 in response to the operation performed on the UI 422. In this case, the optimal filter corresponding to a desired sound environment is selected from the database 421 in response to the operation performed on the UI 422.

For example, sometimes locations at which users want to localize a sound image of the sound source 106 are different depending on differences in hearing sensation between individuals or depending on usage situations. For this reason, the users are allowed to operate the UIs 422 to select locations of the sound image localization. This enables construction of system with high convenience for listeners (users). In addition, it is known that the HRTFs are different between individuals due to their ear shapes. Therefore, it is possible for user to select optimal HRTFs corresponding to an individual difference from HRTFs corresponding to a plurality of ear shapes that are classified for sound image locations and stored in the database 420.

Also in the case of the sound environment, it is possible for the user to select an optimal sound environment by using the UI 422 to set the sound of the sound source 406 in a desired sound environment. For example, it is possible to listen to the sound of the sound source 406 in a sound environment such as a concert venue, a movie theater, or the like.

Figure 11:
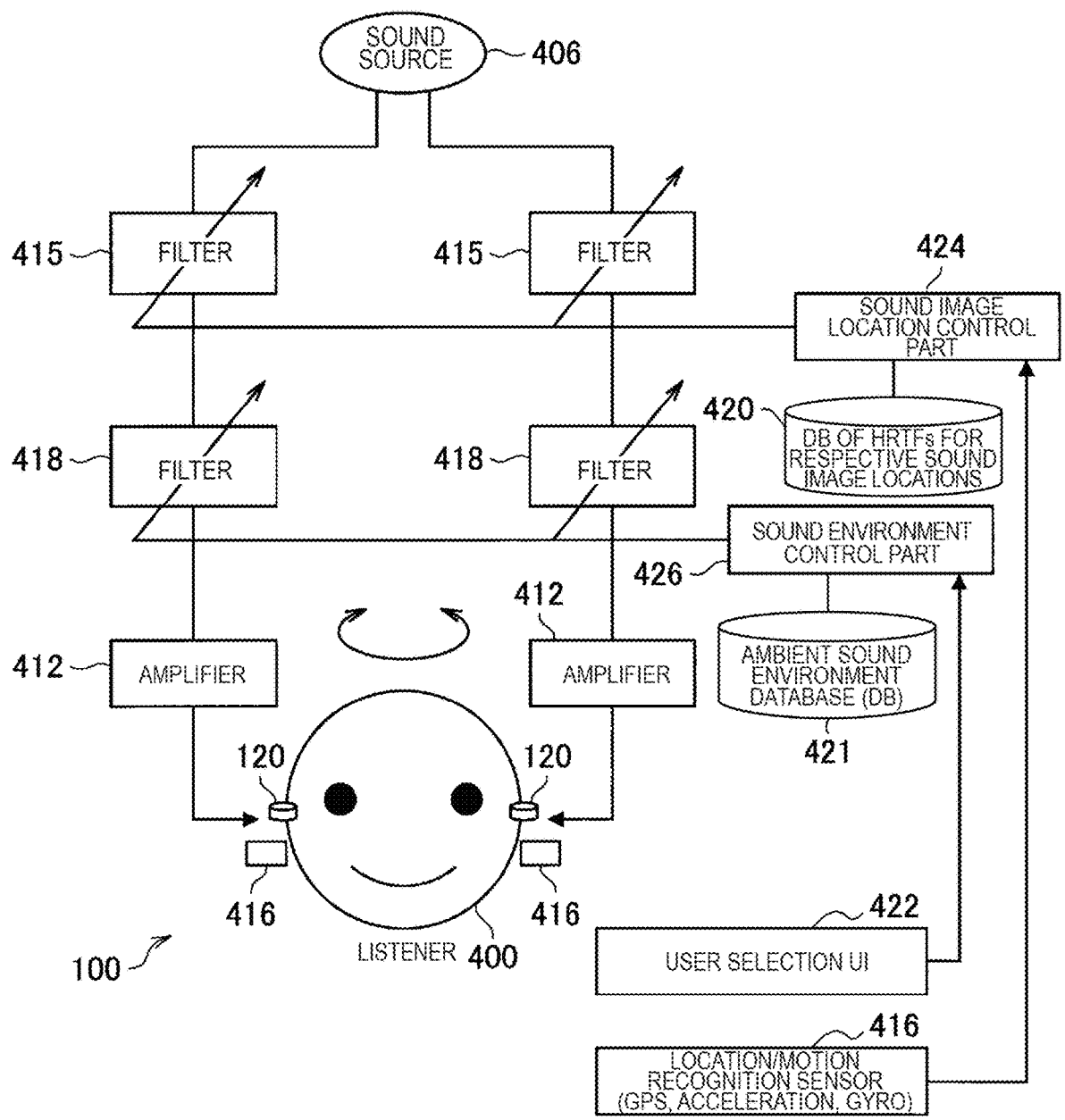
FIG. 11 is a schematic diagram illustrating a configuration further including a process of fixing a sound image location with respect to a real space in tandem with movement of a head detected by sensors such as acceleration sensors and gyro sensors.

FIG. 11 illustrates a configuration further including a process of fixing a sound image location with respect to a real space in tandem with movement of a head detected by the sensors 416 such as acceleration sensors and gyro sensors illustrated in FIG. 7. The sensors 416 may be integrated with the sound output device 100. FIG. 11 illustrates a case in which the sensors 416 detects movement of the head, and the sound image location control part 424 automatically selects optimal filters from the database 420 in accordance with the movement of the head and updates the filters 415. Note that, in this case, it is preferable to change a sound image localization location to follow the movement of the head as illustrated in FIG. 11, after the user designates the sound image localization location of the sound of the sound source 406 by using the UI 422 as illustrated in FIG. 10. Therefore, it is possible to control the head-related transfer functions such that the sound image location is a constant location in a space even in the case where the direction of the head changes.

Figure 12:
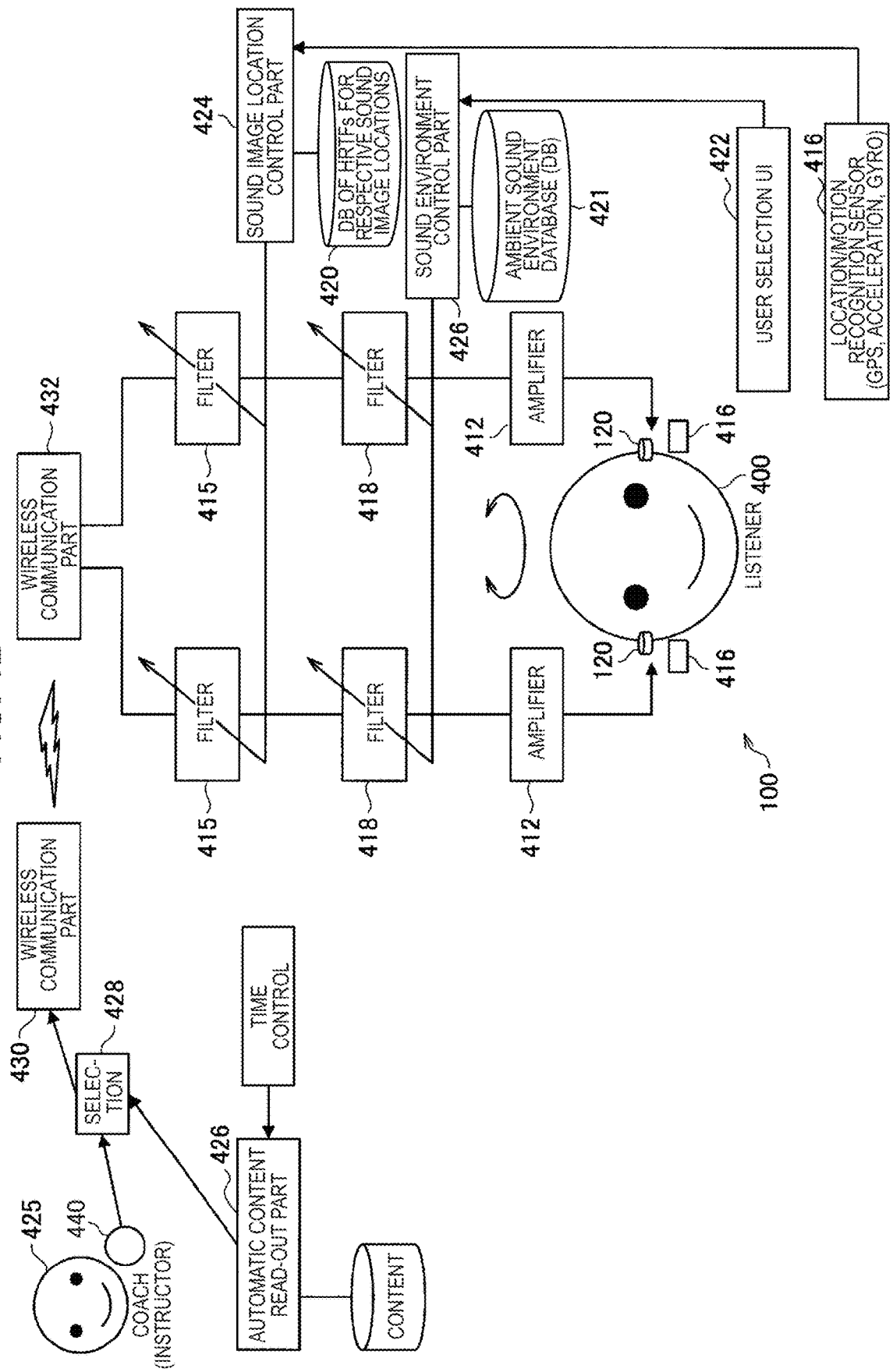
FIG. 12 is a schematic diagram illustrating an example of supplying sound of a sound source through a wireless system such as Bluetooth (registered trademark) or Wi-Fi.

FIG. 12 illustrates an example of supplying sound of the sound source 406 through a wireless system such as Bluetooth (registered trademark) or Wi-Fi. Here, as the sound of the sound source 406, sound of voice of a person who issues instructions (instructor) 425 collected through the microphone 440, or sound of reading performed by an automatic content read-out part 426 is used. Any of such voice is selected through switching performed by the selection part 428, and transmitted form a wireless communication part 430 to a wireless communication part 432 of the sound output device 100. The sound received by the wireless communication part 432 is transmitted to the filters 415 in a way similar to FIG. 11. The automatic content read-out part 426 reads out automatic sound stored in the content database 434. In this case, a time control part 436 controls time, and the automatic sound is read out. Note that, in the configuration illustrated in FIG. 12, the wireless communication part 432 corresponds to the 'sound acquisition part' according to the present disclosure.

Figure 13:
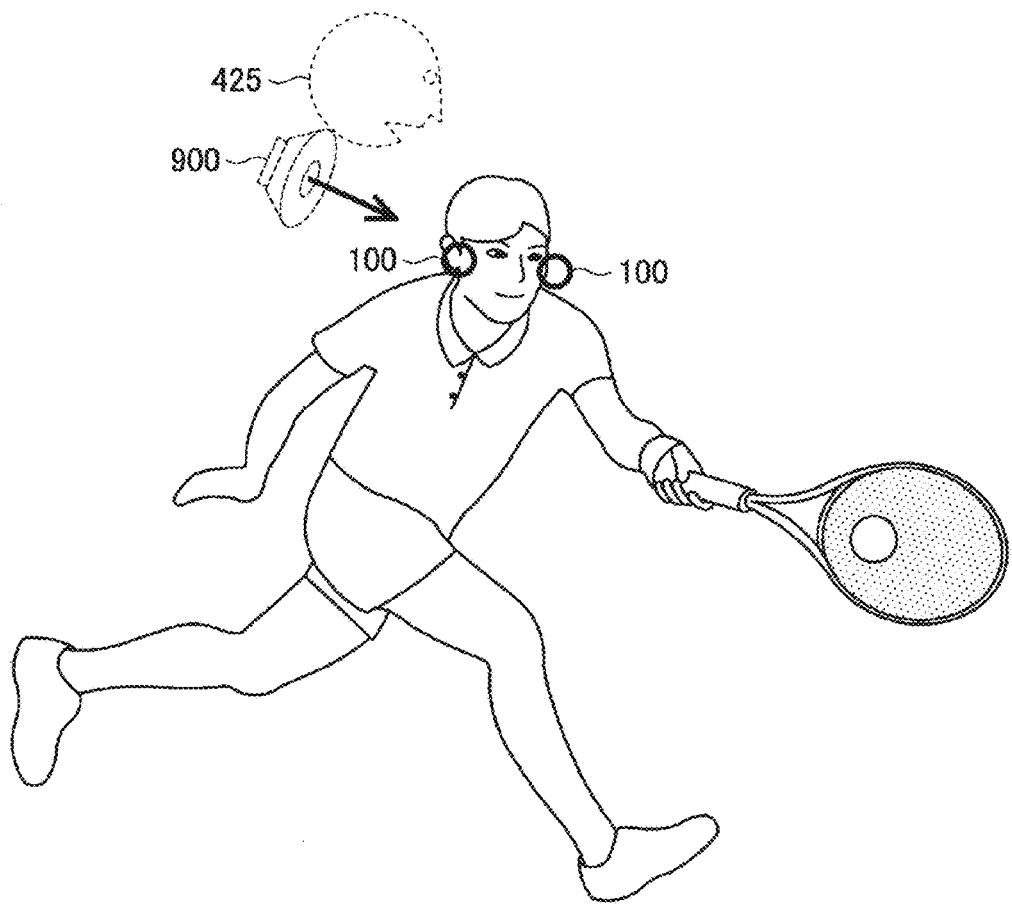
FIG. 13 is a schematic diagram illustrating a system of giving advice from a coach during doing sports.
Figure 14:
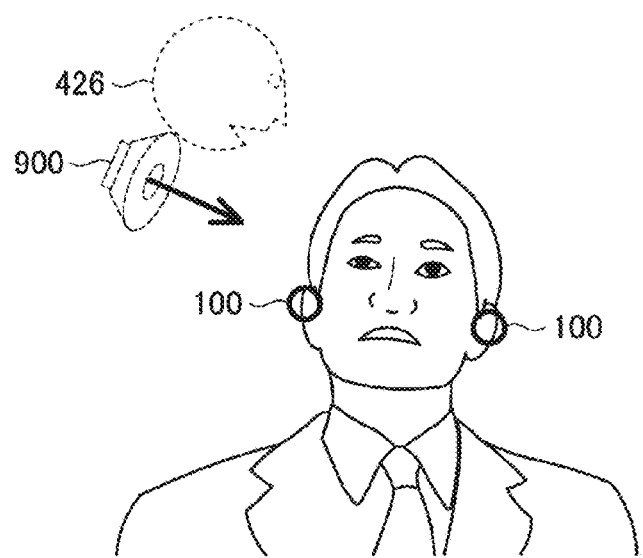

For example, it is possible to apply the configuration illustrated in FIG. 12 to a system illustrated in FIG. 13 for getting advice from his/her coach during playing sports, or a system illustrated in FIG. 14 for giving instructions to a presentation speaker from an outside during a presentation or the like. In the case illustrated in FIG. 13, a tennis player wears the sound output device 100 on his ears, and a tennis coach issues instructions as an instructor 425 by voice. The sound collected by the microphone 440 is received by the wireless communication part 432, subjected to processing through the filters 415 and 418, and reaches the ears of the player. For example, a virtual speaker 900 is set through a sound image localization process of the filters 415 such that advice of the coach comes from approximate location behind the right side of the head of the player. In this case, the player can also hear ambient sound with sufficient sound volume, the player can enjoy sports in view of a safety aspect, and can listen to advice from the coach during playing the sports.

In the case illustrated in FIG. 14, a presentation speaker wears the sound output device 100 on his ears, the wireless communication part 432 receives sound read out by the automatic content read-out part 426, the filters 415 and 418 process the sound, and the sound reaches the ears of the presentation speaker. For example, also in this case, a virtual speaker 900 is set such that the readout sound comes from an approximate location behind the left or the right side of the head of the presentation speaker through the sound image localization processes of the filters 415. Accordingly, it is possible for the presentation speaker to receive voice instructions while hearing feedback in a venue even during speaking in a presentation, and to get experience as if the instructor is in the back of the presentation speaker.

As described above, there is only a little difference in a way of listening and a distance to a sound image between ambient environmental sound heard by the user and instruction sound from the sound output device 100. Therefore, it is possible to prevent 'distraction of attention' due to ears focusing on specific sound, and it is possible to guide the attention to the sound image location. Therefore, it is also possible to reduce time necessary for transitioning attention of a user from the ambient environmental sound to the instruction sound, in comparison with conventional cases in which the instruction sound is lateralized.

Also in the cases of FIG. 13 and FIG. 14, it is possible to improve reality of audio AR experience more by designating a sound image localization location in view of preference (individual difference) of a user with regard to HRTFs in response to operation performed on the filters 415, or by designating a reproduction environment in response to operation performed on the filters 418, in a way similar to FIG. 10. For example, in the case of FIG. 13, the sound environment is outdoors, and in the case of FIG. 14, the sound environment is a concert hall or the like. In addition, as described in FIG. 11, by performing a process in tandem with movement of a head detected by the sensors 416 such as acceleration sensors and gyro sensors, it is possible to feel as if the sound information presented by the sound output information 100 is localized at a specific place in a real world. Therefore, it is possible to improve reality of the sound information presented by the sound output device 100, and this has advantage that it is possible to recognize the information faster due to the cocktail party effect.

Figure 15:
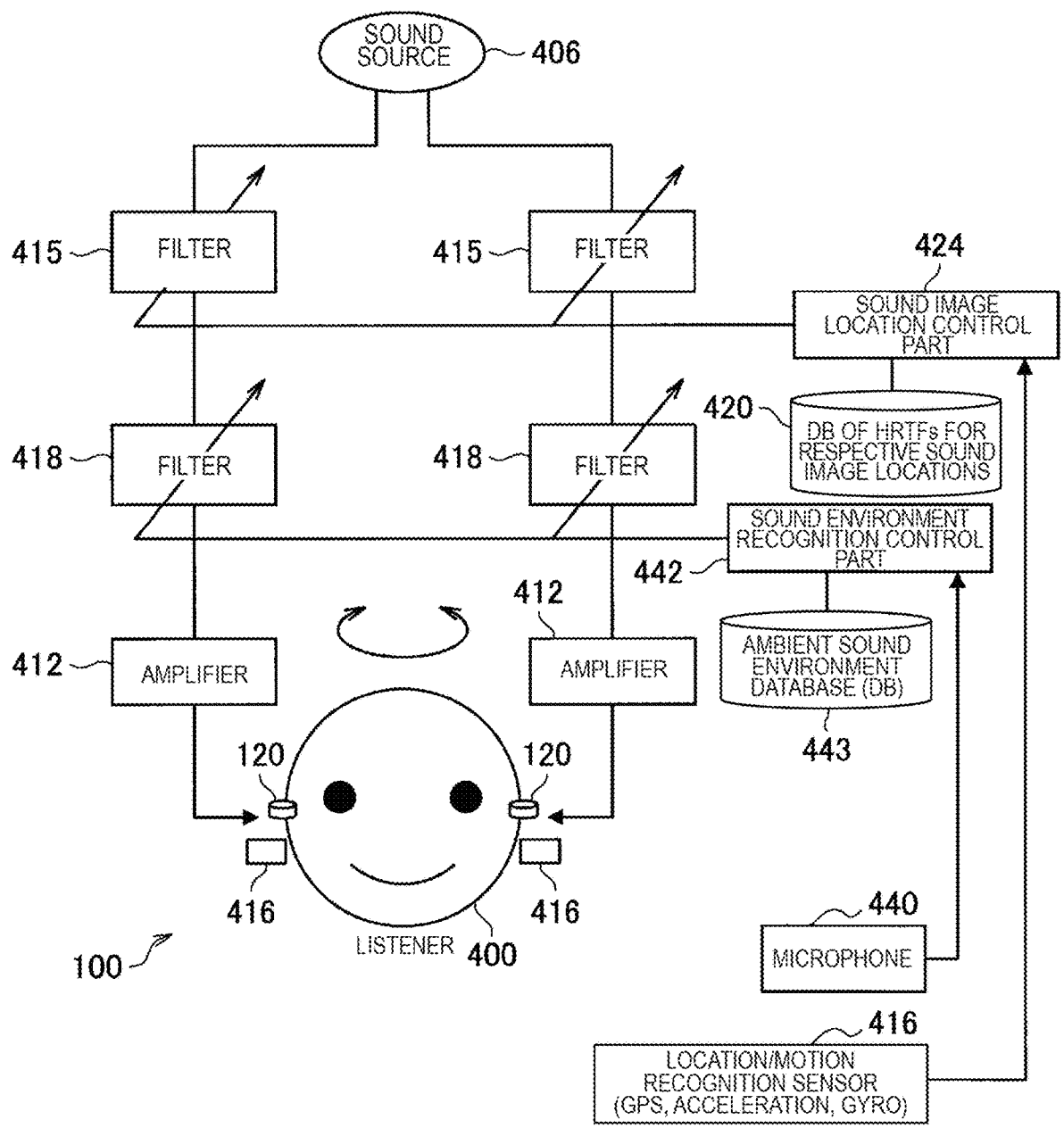
FIG. 15 is a schematic diagram illustrating an example of a sound output device provided with a microphone.

Note that, in the case of the usage methods illustrated in FIG. 13 and FIG. 14, it is possible to install a microphone for telephone call in the sound output device 100. FIG. 15 is a schematic diagram illustrating an example of the sound output device 100 provided with a microphone 440. For example, in the case of the configuration illustrated in FIG. 13, it is possible to communicate with a coach during playing sports by transmitting sound collected through the microphone 440 from the wireless communication part 432 to an instructor terminal (such as a smartphone). In addition, in the case of using the voice teleprompter illustrated in FIG. 14, it is possible to allow an instructor to clearly listen to a dialogue of a presentation speaker when sound collected by the microphone 440 is transmitted to a terminal of the instructor. In addition, for example, in the configuration illustrated in FIG. 15, it is possible for the sound environment recognition control part 442 to refer to the ambient sound environment database 443, recognize an ambient sound environment, and optimally adjust the filters 418 on the basis of sound signals collected by the microphone 440 when using the microphone installed in the sound output device 100. The filters 418 are configured to adjust the sound environment.

Figure 16:
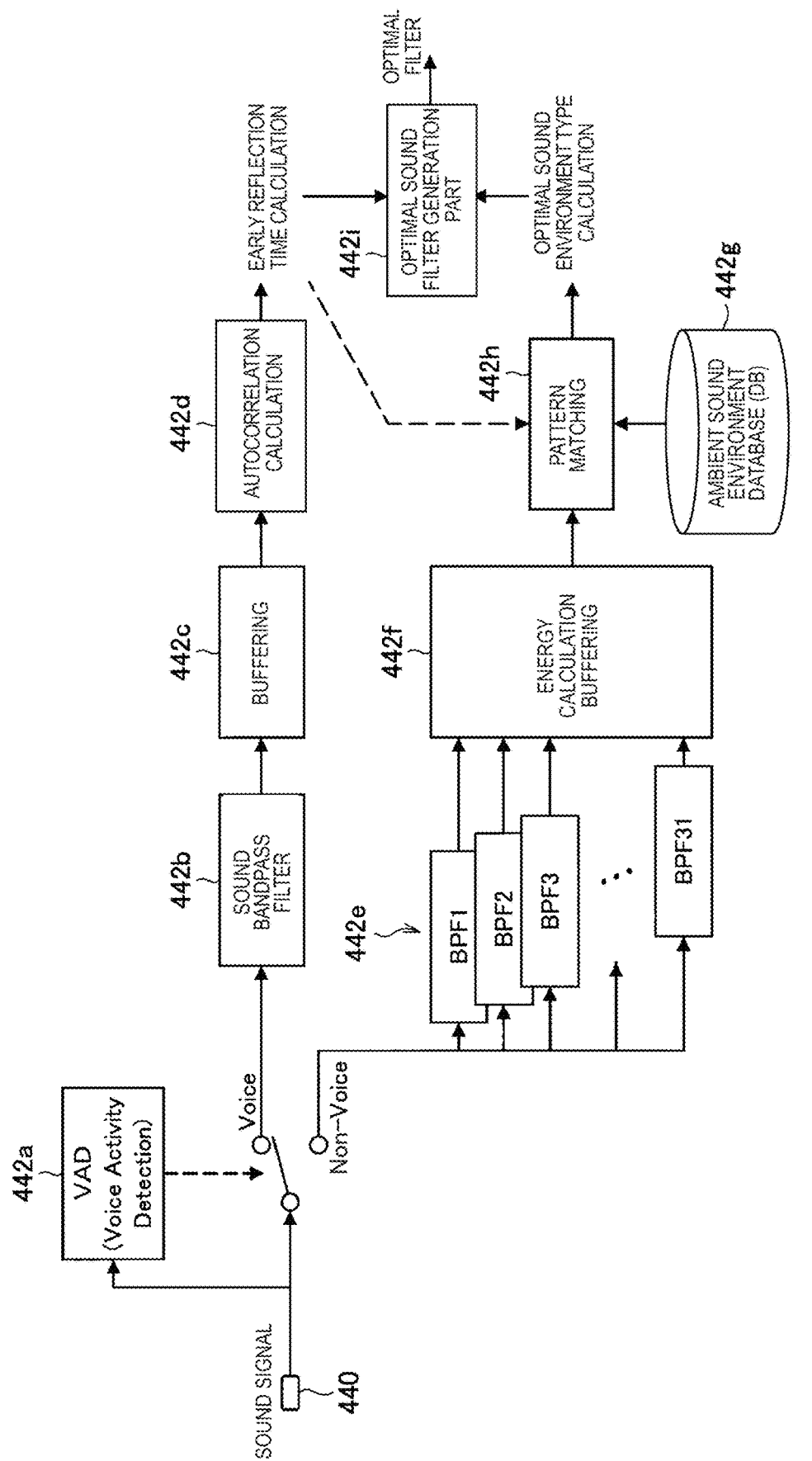
FIG. 16 is a schematic diagram illustrating a specific configuration example of a sound environment recognition control part in the configuration illustrated in FIG. 15.

FIG. 16 is a schematic diagram illustrating a specific configuration example of the sound environment recognition control part 442 in the configuration illustrated in FIG. 15. Sound signals collected through the microphone 440 are transmitted to voice activity detection 442a. The VAD 442a determines whether a principal component of sound currently being collected by the microphone 440 is voice (human voice) or sound other than the voice (ambient environmental sound), and switch analysis algorithms. As a determination method performed by the VAD 442a, it is possible to use general methods such as combination of spectrum entropy and a cosine value between spectra. In the case where the VAD 442a determines that a sound signal stream is voice, the signals are filtered through a sound bandpass filter 442b, and buffered by a buffer 442c, and autocorrelation thereof is calculated by an autocorrelation calculation part 442d.

Figure 17:
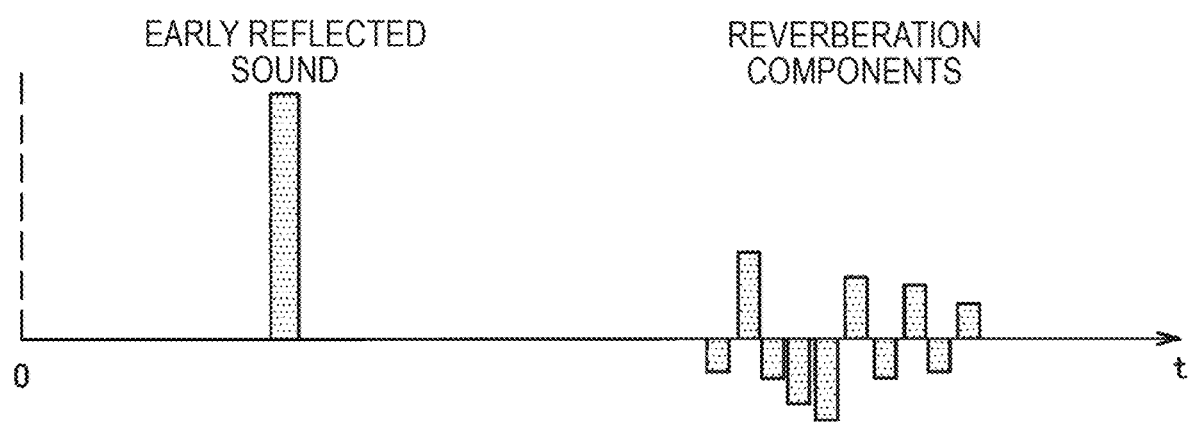
FIG. 17 is a schematic diagram illustrating a method of estimating reflection sound and reverberation through an autocorrelation calculation part.

FIG. 17 is a schematic diagram illustrating a method of estimating reflection sound and reverberation through the autocorrelation calculation part 442d. In FIG. 17, sound is generated at time 0. The microphone 440 is attached on the sound output device 100 and arranged near an ear. Therefore, sound signals collected by the microphone 440 at the time 0 has high S/N. On the other hand, the generated sound is reflected in an ambient environment such as a room, and early reflected sound and reverberation components generate after the time 0. Therefore, it is possible to estimate a level, time, reverberation, and the like of the early reflected sound by using the voice of the user itself at the time 0 as a sound source and calculating autocorrelation.

On the other hand, in the case where the VAD 442a determines that the sound signal stream is non-voice, it is determined that the collected sound is ambient environmental sound itself. To analyze features of the ambient environmental sound, the ambient environmental sound is classified by using band pass filters (BPFs) 442e for respective bands, energy in the respective bands is calculated, and a buffer 442f stores them in addition to their time-series change (variation). This result is checked against a prepared ambient sound environment database 442g, the pattern matching part 442h matches the result with the ambient sound environment database 442g, and a spectrum characteristic of a most similar optimal sound environment is selected. The optimal sound filter generation part 442i integrates a characteristic obtained from the non-voice and a characteristic obtained when it is determined that the sound signal is the voice, to generate filters simulating an ambient sound environment.

In addition, as indicated by a dashed arrow in FIG. 16, the early reflected sound obtained when it is determined that the sound signal is the voice, reverberation behavior information (level and time), and information regarding a spectrum and temporal change of ambient environmental sound may be directly input to the pattern matching part 442h, and a characteristic that is comprehensively considered to be most similar is selected from the ambient sound environment database 442g to generate filters. In this case, it is possible to generate filters that are comprehensively considered to be most similar in view of information regarding the early reflected sound and reverberation.

Figure 18:
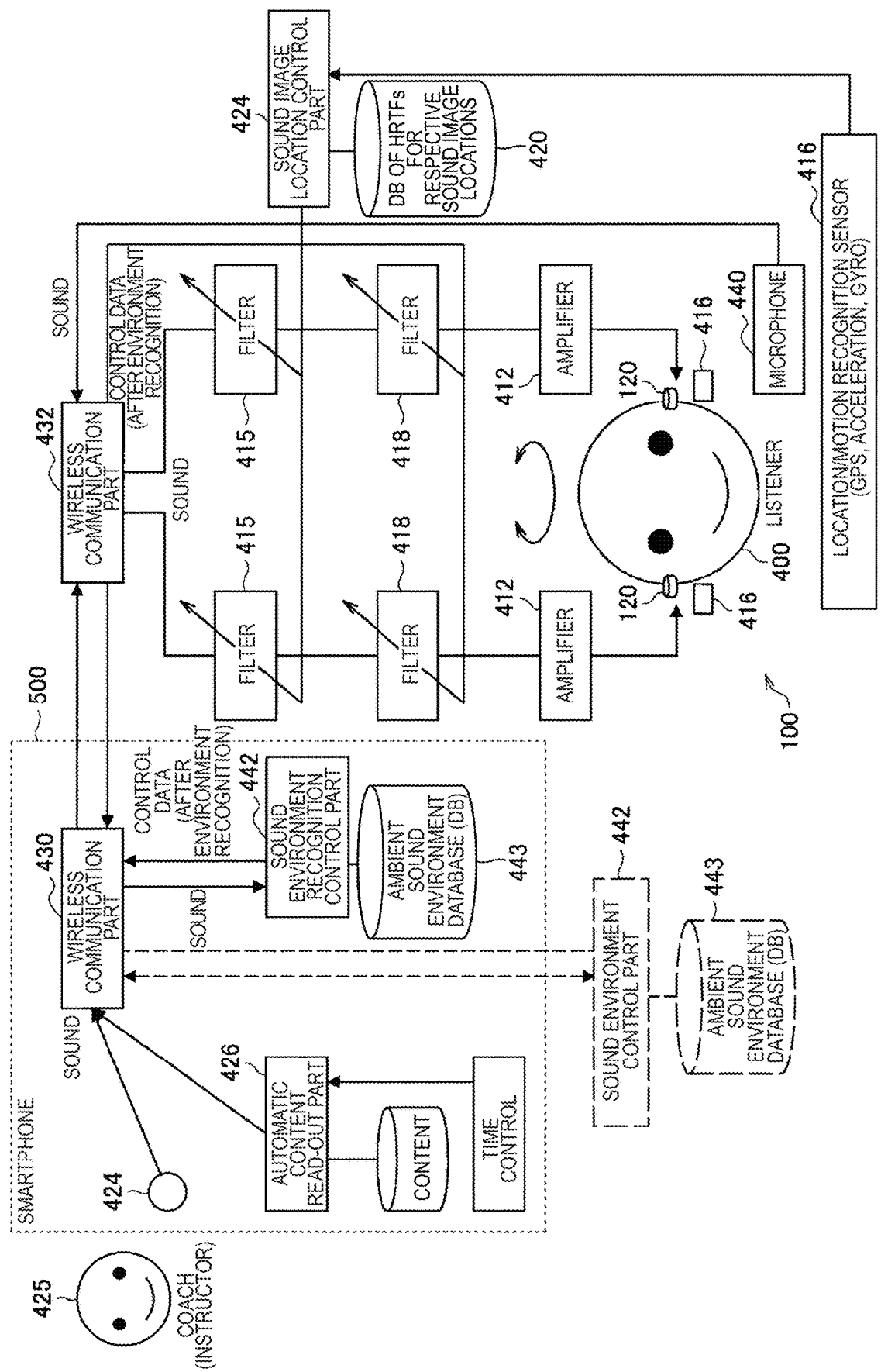
FIG. 18 is a schematic diagram illustrating an example in which a sound output device is capable of performing communication with an electronic device with rich computation resource such as a smartphone, and the electronic device includes a sound environment recognition control part and an ambient sound environment database.

FIG. 18 is a schematic diagram illustrating an example in which the sound output device 100 is capable of performing communication with an electronic device 500 with rich computation resource such as a smartphone, and the electronic device 500 includes the sound environment recognition control part 442 and the ambient sound environment database 443. According to the configuration illustrated in FIG. 18, sound information collected by the microphone 440 of the sound output device 100 is transmitted from the wireless communication part 432 to the wireless communication part 430 of the electronic device 500. On the basis of the sound information, the sound environment recognition control part 442 of the electronic device 500 recognizes an ambient sound environment with reference to the ambient sound environment database 443. Information regarding the sound environment recognized by the sound environment recognition control part 442 is transmitted form the wireless communication part 430 of the electronic device 500 to the wireless communication part 432 of the sound output device 100. The filter 418 of the sound output device 100 is controlled on the basis of information related to the sound environment received from the electronic device 500.

Note that, as illustrated using dashed lines in FIG. 18, the sound environment recognition control part 442 and the ambient sound environment database 443 may be provided outside the electronic device 500. For example, the sound environment recognition control part 442 and the ambient sound environment database 443 may be provided in a cloud or another device capable of communicating with the electronic device 500. In this case, it is also possible to recognize the sound environment by transmitting the sound information collected by the microphone 440 to another device or a server on the cloud.

Figure 19:
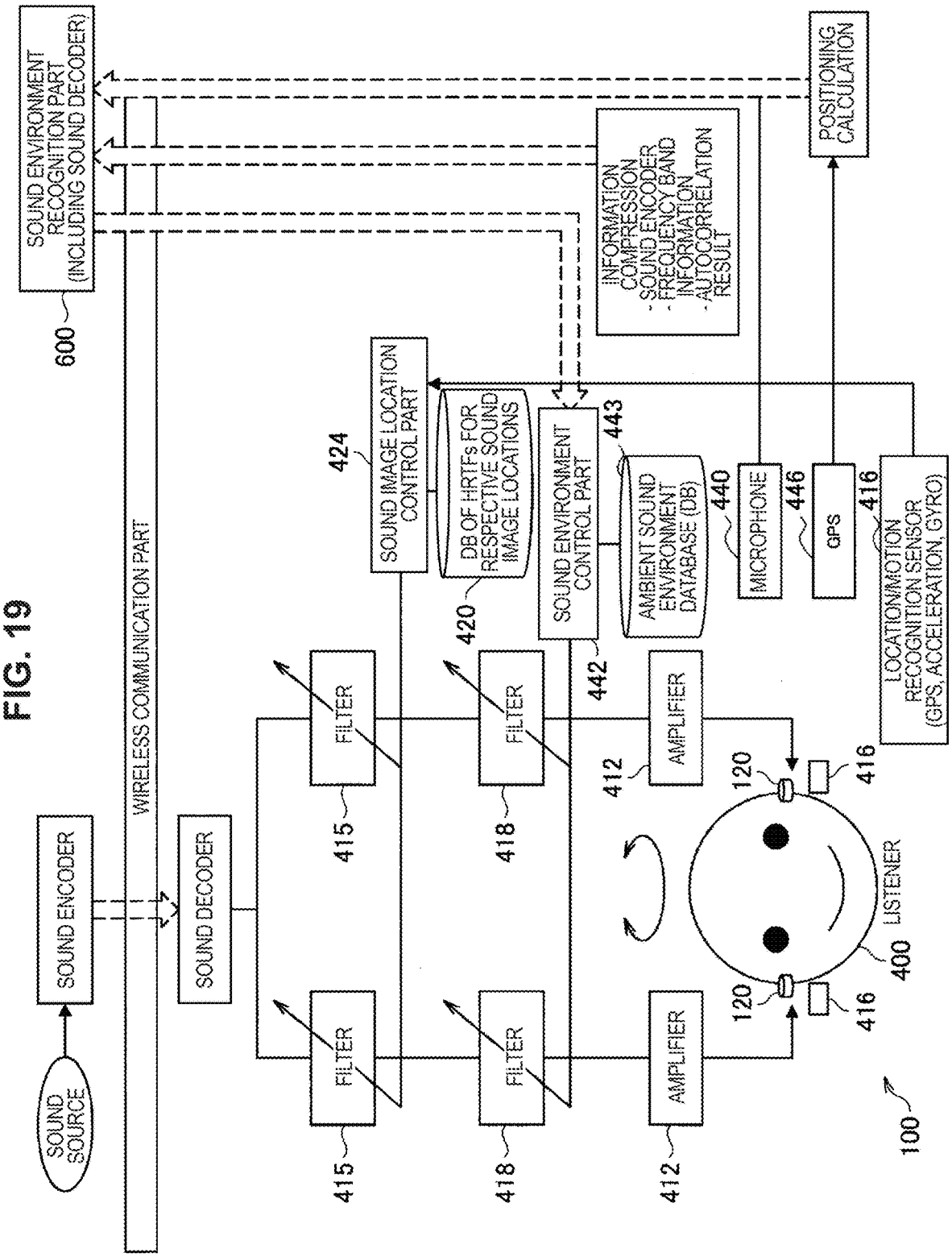
FIG. 19 is a schematic diagram illustrating an example in which the GPS included in a sound output device directly determines a place, a cloud or a smartphone interprets map information on the basis of a result of the determination, and a typical sound environment corresponding to a building or place where a user of the sound output device is located is acquired.

Note that, in the above-described example, the sound environment information is recognized and determined on the basis of the information collected by the microphone 440 and the optimal filters 418 are set. However, as illustrated in FIG. 19, a GPS 446 included in the sound output device 100 may directly determine a location, a cloud or a smartphone may interpret map information on the basis of a result of the determination, and a typical sound environment corresponding to a building or location where a user of the sound output device 100 is located may be acquired, for example. According to the configuration illustrated in FIG. 19, place information acquired by the GPS 446 is transmitted to the sound environment recognition part 600 in the server on the cloud. On the basis of the place information, the sound environment recognition part 600 acquires a sound environment corresponding to a building, a place, or the like where a user is present with reference to map information, and transmits the sound environment to the sound environment control part 442 in the sound output device 100. The sound environment control part 442 controls the filters 418 on the basis of the sound environment obtained from the place information.

Note that, FIG. 19 illustrates an example in which the sound source 406 is on a cloud. Sound information of the sound source 406 is encoded by an encoder, transmitted to the sound output device 100 through wireless communication, and decoded by the sound output device 100.

Figure 20:
FIG. 20 is a schematic diagram illustrating an example of a user listening to navigation information while hearing ambient sound during driving of a car or during riding a bicycle.
Figure 21:
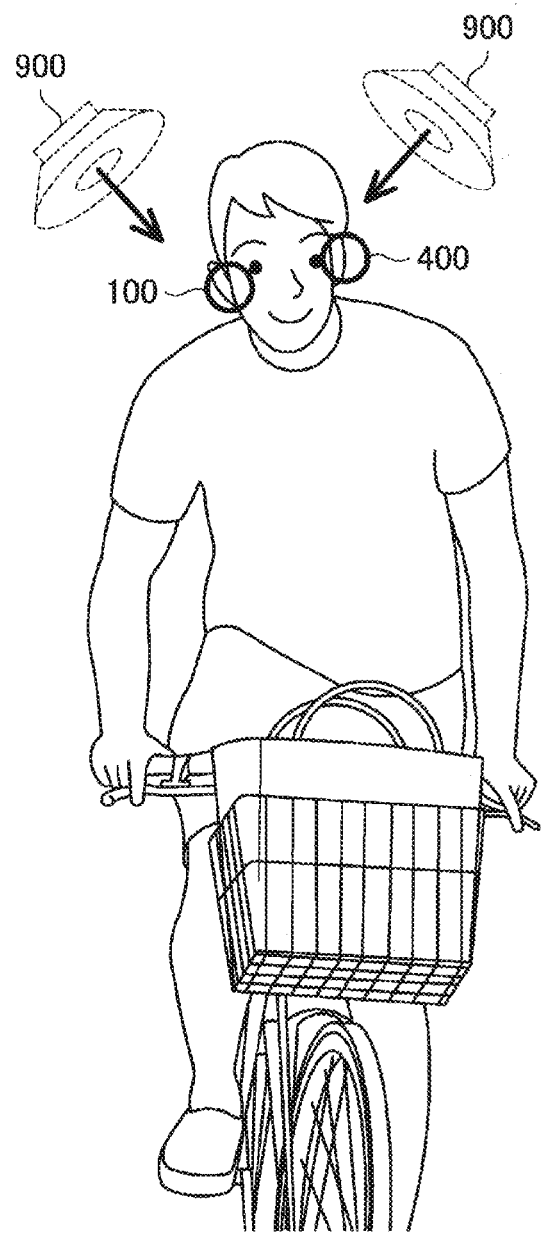
FIG. 21 is a schematic diagram illustrating an example of a user listening to navigation information while hearing ambient sound during driving of a car or during riding a bicycle.
Figure 22:
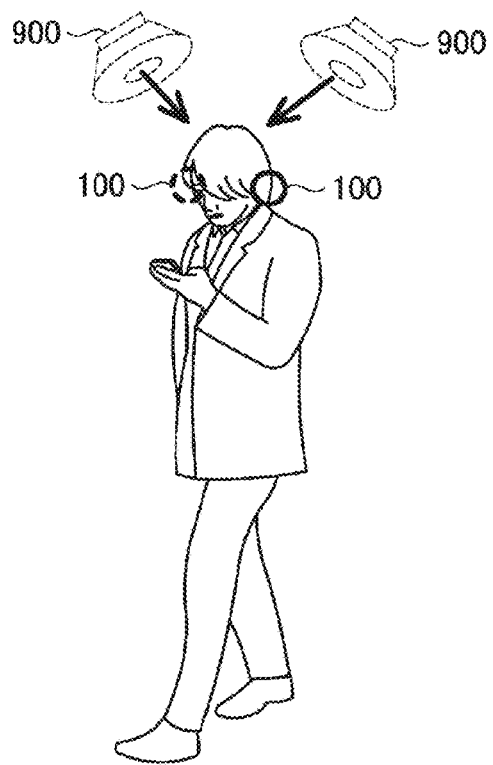
FIG. 22 is a schematic diagram illustrating an example of a user listening to navigation information while hearing ambient sound during walking.
Figure 23:
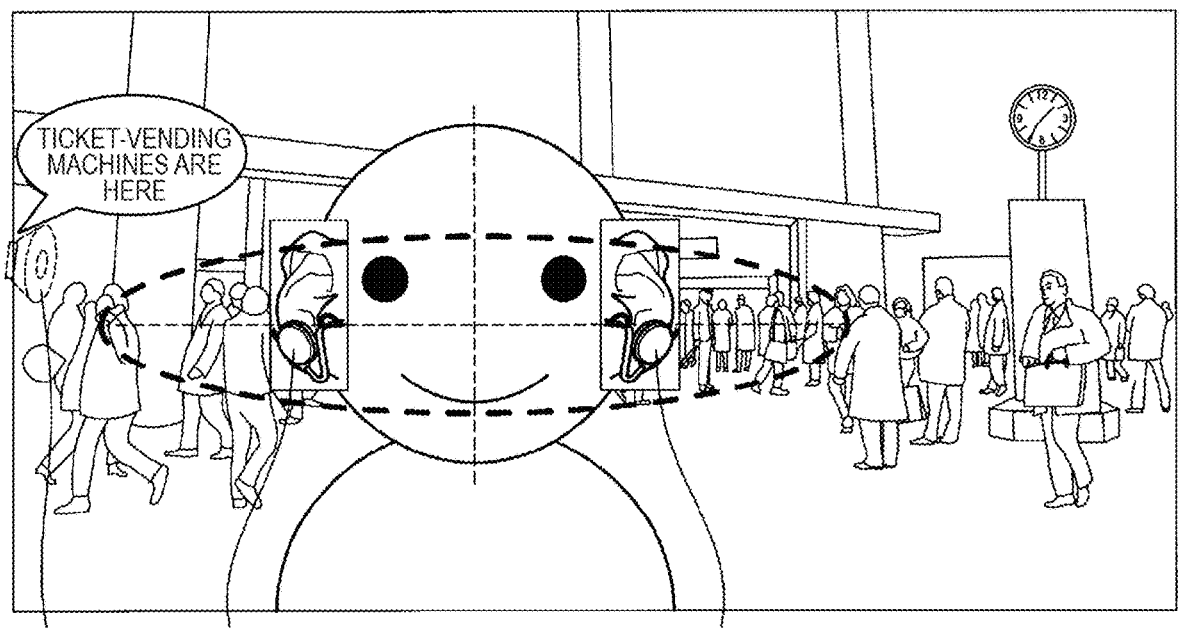
FIG. 23 is a schematic diagram illustrating an example of a user listening to navigation information while hearing ambient sound during walking.

In addition, since the sound output device 100 includes the GPS 446, it is possible to navigate the listener 400 on the basis of information acquired through the GPS 446. Therefore, for example, it is possible for a user to listen to navigation information from the sound output device 100 while hearing ambient sound even in the case of driving a car as illustrated in FIG. 20, in the case of riding a bicycle as illustrated in FIG. 21, or in the case of walking as illustrated in FIG. 22 and FIG. 23. As an example, a sound image is localized through filters 415 such that navigation voice is localized above the head of a user or near a foot of the user. By localizing the sound image at a location different from locations of general ambient sound generation sources, it is possible for a user to clearly distinguish the navigation voice from the ambient sound through hearing, and it is possible for the user to safely listen to the navigation voice while hearing the ambient sound even in the case of driving.

Figure 24:
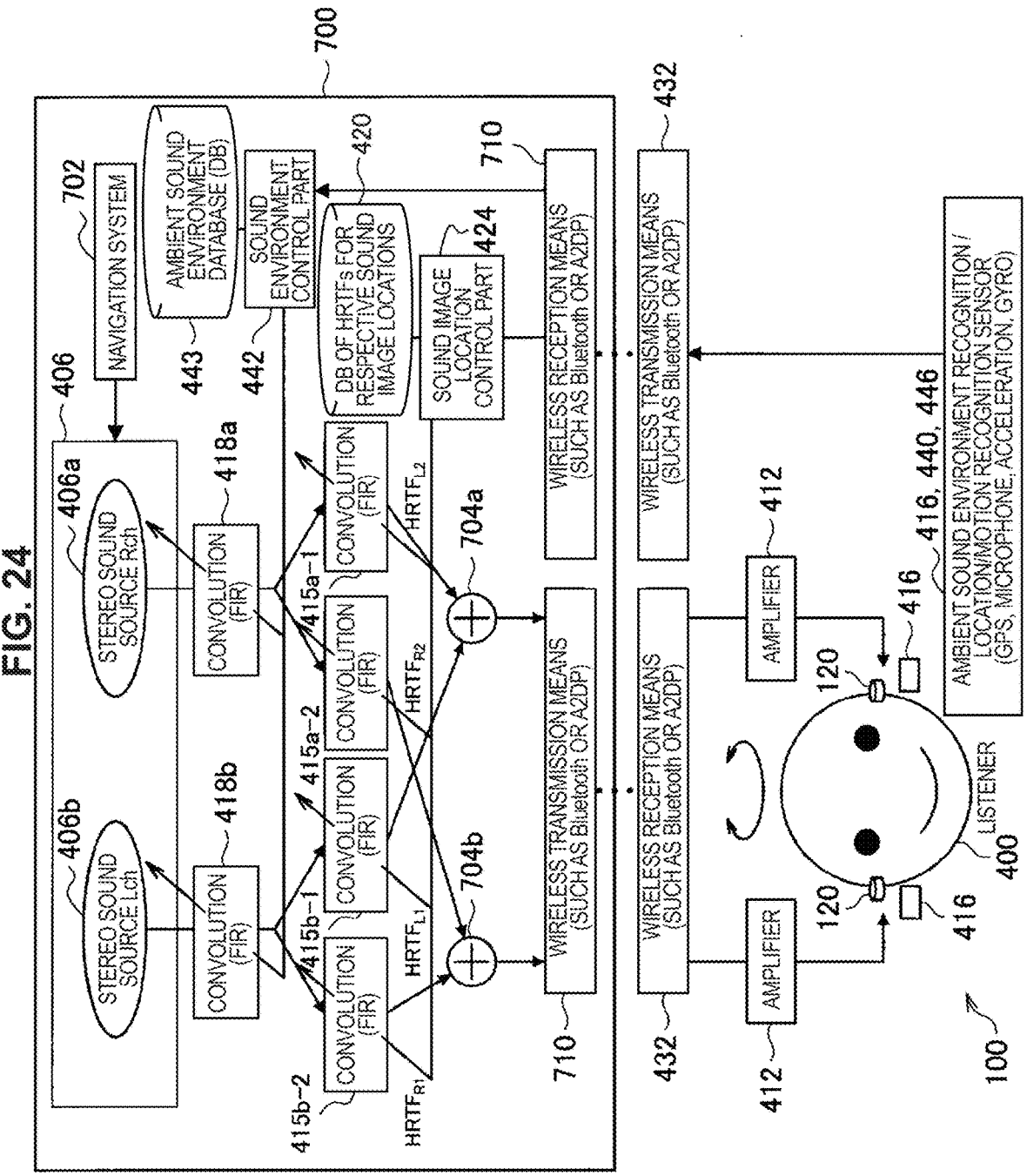
FIG. 24 is a schematic diagram illustrating an example of a configuration of navigating a listener on the basis of information acquired through the GPS.

FIG. 24 is a schematic diagram illustrating an example of a configuration of navigating a listener on the basis of information acquired through the GPS 446. The configuration illustrated in FIG. 24 includes the sound output device 100 and a system 700 such as a smartphone or a server on a cloud. In FIG. 24, location information acquired by the GPS 446 is transmitted to the system 700 in the smartphone or the cloud via the wireless communication part 432 and a wireless communication part 710.

The wireless communication part 710 in the system 700 transmits the location information to a navigation system 702. The navigation system 702 transmits navigation voice information to the sound source 406 on the basis of the location information.

In addition, information acquired by the sensors 416 and the microphone 440 is also transmitted to the system 700 in the smartphone or the cloud via the wireless communication part 432. The sound image location control part 424 provided in the system 700 in the smartphone or the cloud controls the filters 415 on the basis of information of the sensors 416 to control a sound image location. In addition, the sound environment recognition control part 442 provided in the system 700 in the smartphone or the cloud recognizes a sound environment on the basis of information of the microphone 440 to control the filters 418.

According to the configuration illustrated in FIG. 24, the sound source 406 is configured as a stereo sound source. The sound source 406 includes a sound source 406a of a right channel (Rch) and a sound source 406b of a left channel (Lch). In addition, the filters 418 for setting a sound environment include a filter 418a of the right channel (Rch) and a filter 418b of the left channel (Lch). In addition, the filters 415 for setting a sound image location include filters 415a-1 and 415a-2 of the right channel (Rch) and filters 415b-1 and 415b-2 of the left channel (Lch). Therefore, it is possible for the sound environment recognition control part 442 to separately control the left and right filters 418a and 418b, and it is possible for the sound image location control part 424 to separately control the left and right filters 415a-1, 415a-2, 415b-1, and 415b-2.

For example, when a destination, a target object, a future movement direction, or the like is on the left or right side in the case where the navigation voice information is provided from the sound source 406 to a user, it is desirable to present sound as if a sound image is localized in a direction toward the destination, the target object, or the future movement direction. For example, when the destination, the movement direction, or the like is on the left side, a sound image of the navigation voice information is set to be location on the left side. Therefore, it is possible for the user to recognize the direction quickly and easily. This results in safer behavior of the user.

Therefore, for example, when the destination, the movement direction, or the like is on the left side, the sound image location control part 424 controls the left and right filters 415a-1, 415a-2, 415b-1, and 415b-2 on the basis of the navigation information such that the navigation voice information is localized on the left side of the user and user can hear the navigation voice information that comes from the left side of the user.

An addition part 704a adds outputs from the filter 415a-1 and the filter 415b-1 and transmits it to the wireless communication part 710. An addition part 704b adds outputs from the filter 415a-2 and the filter 415b-2 and transmits it to the wireless communication part 710. The wireless communication part 710 transmits sound information obtained from the addition parts 704a and 704b to the wireless communication part 432 of the sound output device 100. The sound output device 100 uses an amplifier to amplify the sound information transmitted from the system 700, and provides the amplified sound information to the user.

By using such a configuration, it is possible for the sound image location control part 424 to freely set a sound image location. For example, as illustrated in FIG. 20 and FIG. 21, it is possible to set a virtual speaker 900 that is localized as a sound image in a space through the sound image localization, and it is possible to freely set the location of the virtual speaker 900 and provide voice to a user. Accordingly, it is possible for a user to hear the navigation voice information from the left side when the destination, the movement direction, or the like is on the left side.

Note that, according to the configuration illustrated in FIG. 24, it is possible to reproduce stereo music when navigation is not necessary. In this case, it is also desirable to set the virtual speaker 900 that is localized as a sound image in a space through the sound image localization, and to reproduce the sound from the virtual speaker 900, as illustrated in FIG. 20 and FIG. 21. In this case, it is also possible to freely set the location of the virtual speaker 900 by separately performing filtering on the right channel (Rch) and the left channel (Lch), as illustrated in FIG. 24.

Therefore, it is possible for the user to clearly distinguish ambient environmental sound and sound provided from the sound environment device 100. For example, it becomes easier to distinguish navigation voice information or stereo music from the ambient environmental sound when localizing the navigation sound information or the stereo music right above or right below the user. Therefore, even in the case where the ambient environmental sound includes human voice or music, it is possible for the user to clearly distinguish the ambient environmental sound from the navigation voice information or stereo music provided from the sound output device 100. Accordingly, it is possible to clearly distinguish the ambient environmental sound from the sound provided from the sound output device 100 even in the case of using the sound output device 100 while driving a car as illustrated in FIG. 20, while riding a bicycle as illustrated in FIG. 21, or while walking as illustrated in FIG. 22 or FIG. 23. This ensures safety.

Figure 25:
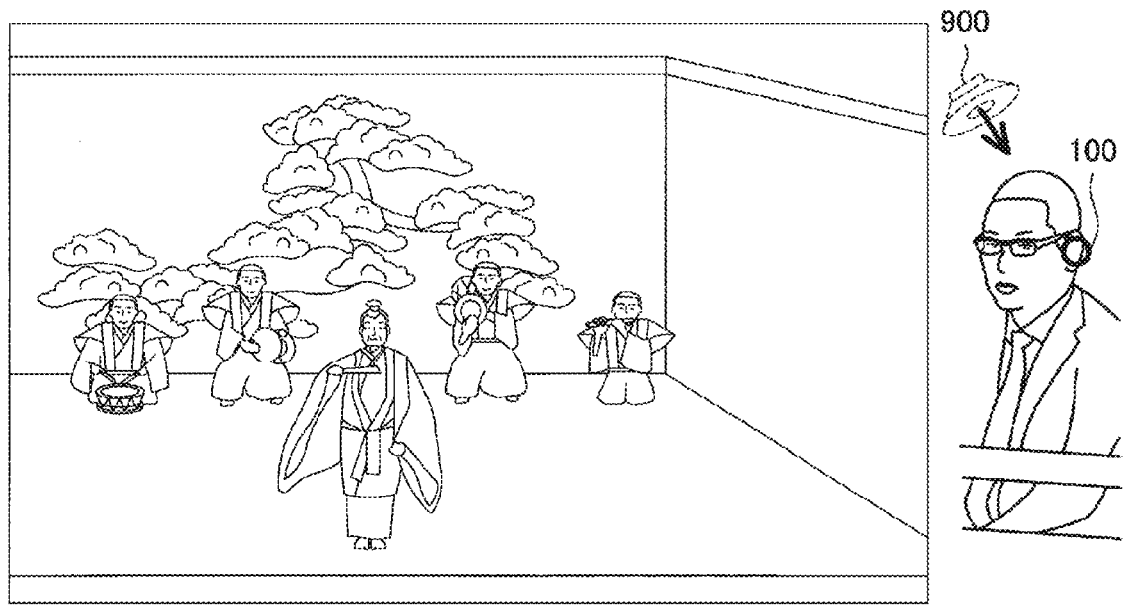
FIG. 25 is a schematic diagram illustrating a case where a plurality of listeners sees Kabuki.
Figure 26:
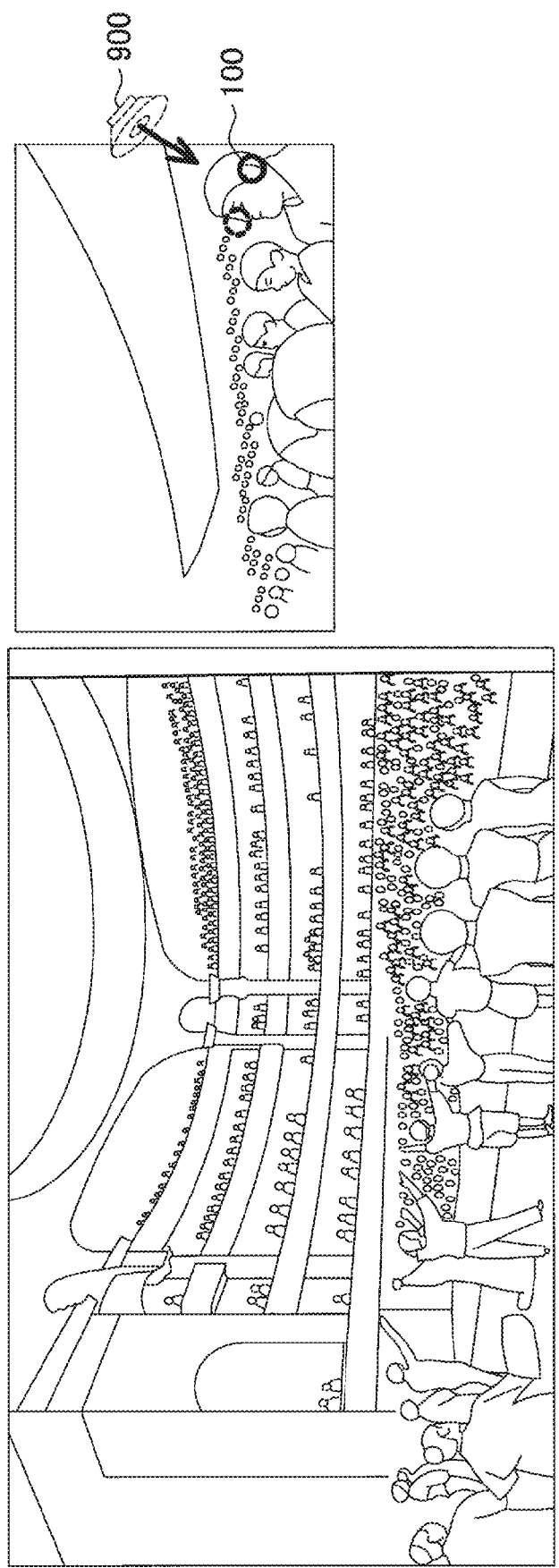
FIG. 26 is a schematic diagram illustrating a case where a plurality of listeners sees opera.

Next, a case where a plurality of listeners enjoy the same content will be described. FIG. 25 illustrates a case where a plurality of listeners see Kabuki, and FIG. 26 illustrates a case where a plurality of listeners see opera. In the case where users see such a show, it is possible to acquire sub-information related to the show by wearing the sound output devices 100.

In general, most of devices for providing voice serving as the sub-information of Kabuki or opera provide the voice through an earphone. Here, examples of the sub-information voice include explanation of content of the show in a plurality of language. However, the earphone covers an ear. Therefore, users cannot enjoy direct sound of a play, song, or music played in front of the users through their ears. For this reason, some viewers choose not to listen to sub-information. However, by using the sound output device 100 according to the embodiment, it is possible to deliver direct sound of opera, Kabuki, or the like to ears with no interruption. Therefore, it is possible for the user to directly listen to direct sound from the virtual speaker 900 as the ambient environmental sound. In addition, by the sound output device 100 outputting voice of the sub-information, it is possible to localize a sound image of the sub-voice information at a left rear side of a listener, and the listener can hear the explanation as if someone whispers into his/her ear, for example. Accordingly, it is possible for the user to directly hear live sound of a show or the like and enjoy the atmosphere in the venue while getting explanatory information.

Figure 27:
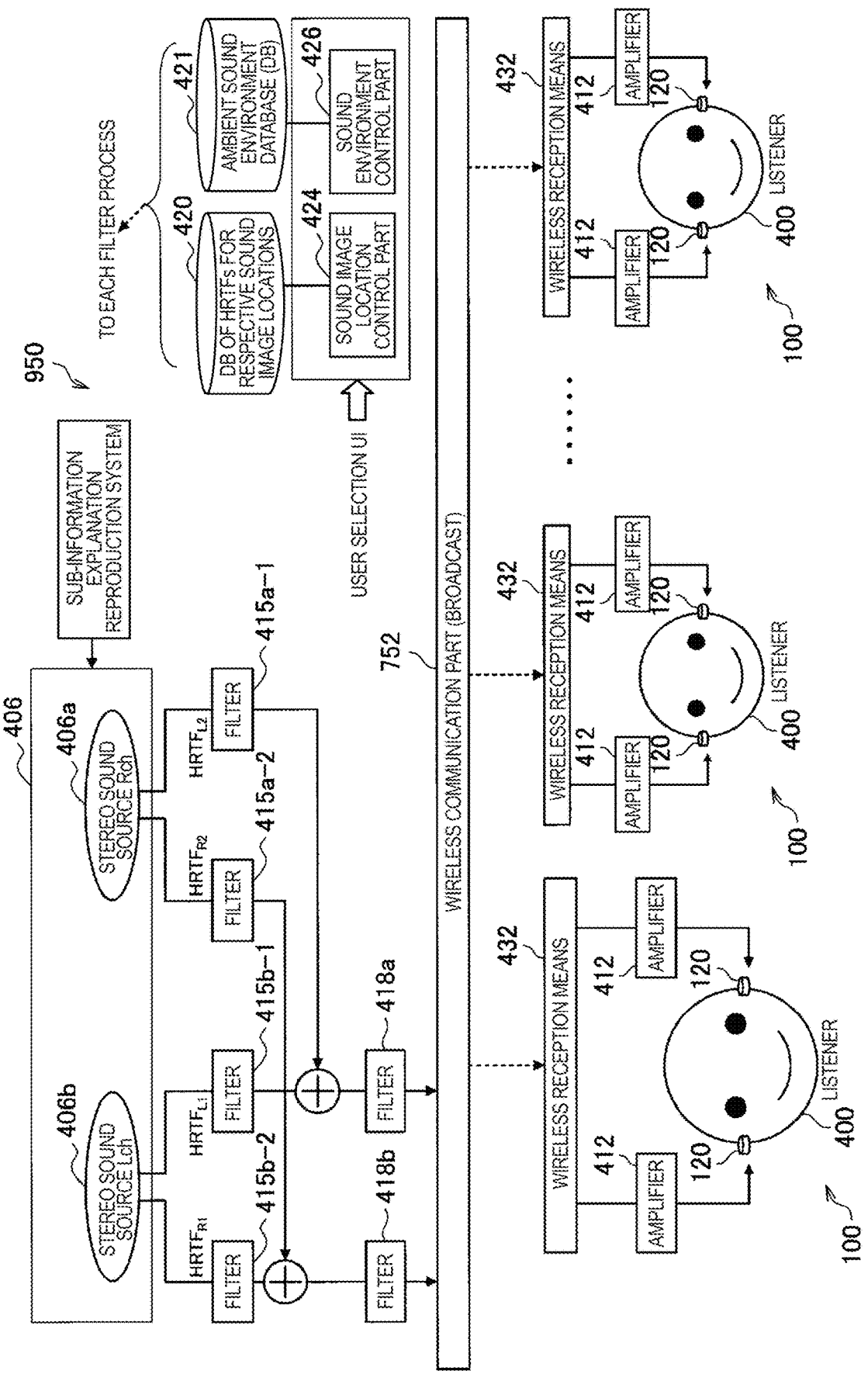
FIG. 27 is a schematic diagram illustrating an example of delivering sound information such as explanation of a show to sound output devices of respective users through a wireless communication part of a sound broadcasting device.

FIG. 27 illustrates an example of delivering sound information such as explanation of a show to sound output devices 100 of respective users through a wireless communication part 752 of a sound broadcasting device 750. As an example, the wireless communication part 752 delivers the sound information through FM broadcasting. It is possible for users to switch languages through his/her hand by utilizing a concept of channels.

In the configuration example illustrated in FIG. 27, the sound source 406 is configured as a stereo sound source in a way similar to FIG. 24. The sound source 406 includes a sound source 406a of a right channel (Rch) and a sound source 406b of a left channel (Lch). In addition, in a way similar to FIG. 24, the sound delivery device 750 includes the filters 415 and 418, the sound image location control part 424, and the sound environment control part 426. It is possible for users to set sound image locations and sound environments by operating UIs. Specifically, in the examples illustrated in FIG. 25 and FIG. 26, a host of the show or the like controls the sound image location control part 424 and the sound environment control part 426 in accordance with venues. Therefore, it is possible to set an optimal sound image location and sound environment.

Figure 28:
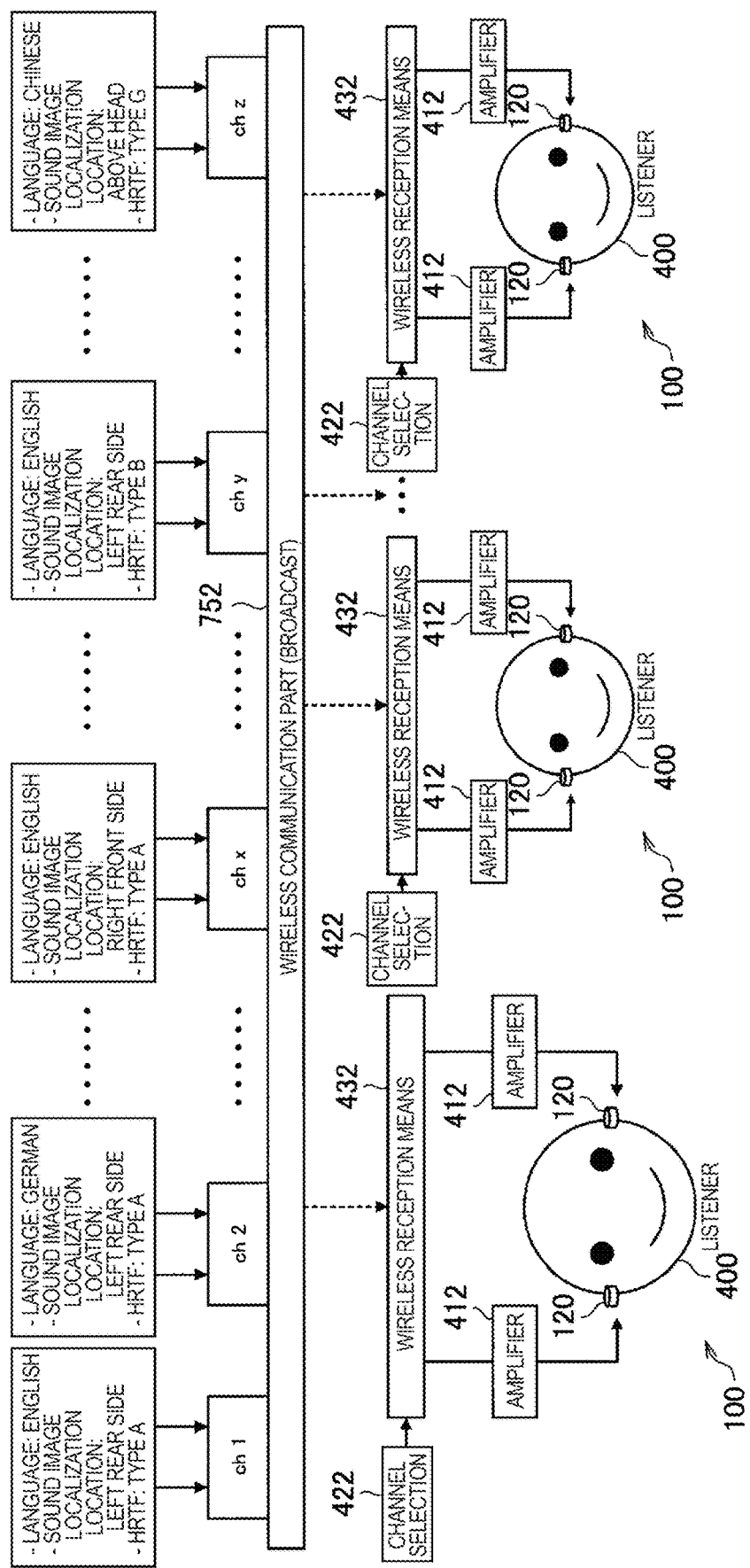
FIG. 28 is a schematic diagram illustrating an example in which sound information of explanation of a show in various languages is used, and filter types of HRTFs are switchable in accordance with difference (compatibility) in the HRTFs or locations of sound image localization between individuals, with regard to the configuration illustrated in FIG. 27.

FIG. 28 illustrates an example in which sound information of explanation of a show in various languages is used, and types pf HRTF filters 415 are switchable in accordance with difference (compatibility) in the sound image localization location and the HRTFs between individuals, with regard to the configuration illustrated in FIG. 27. As illustrated in FIG. 28, when the wireless communication part 752 transmits sub-information contents different from one channel to another, it is possible for a user receiving such sub-information contents to receive optimal sub-information content depending on preference of the user by switching reception channels through the UI 422. The channel switching information selected by a user through the UI 422 is transmitted from the wireless communication part 432 of the sound output device 100 to the wireless communication part 752 on an explanation voice information supplier side, and channels are switched.

Figure 29:
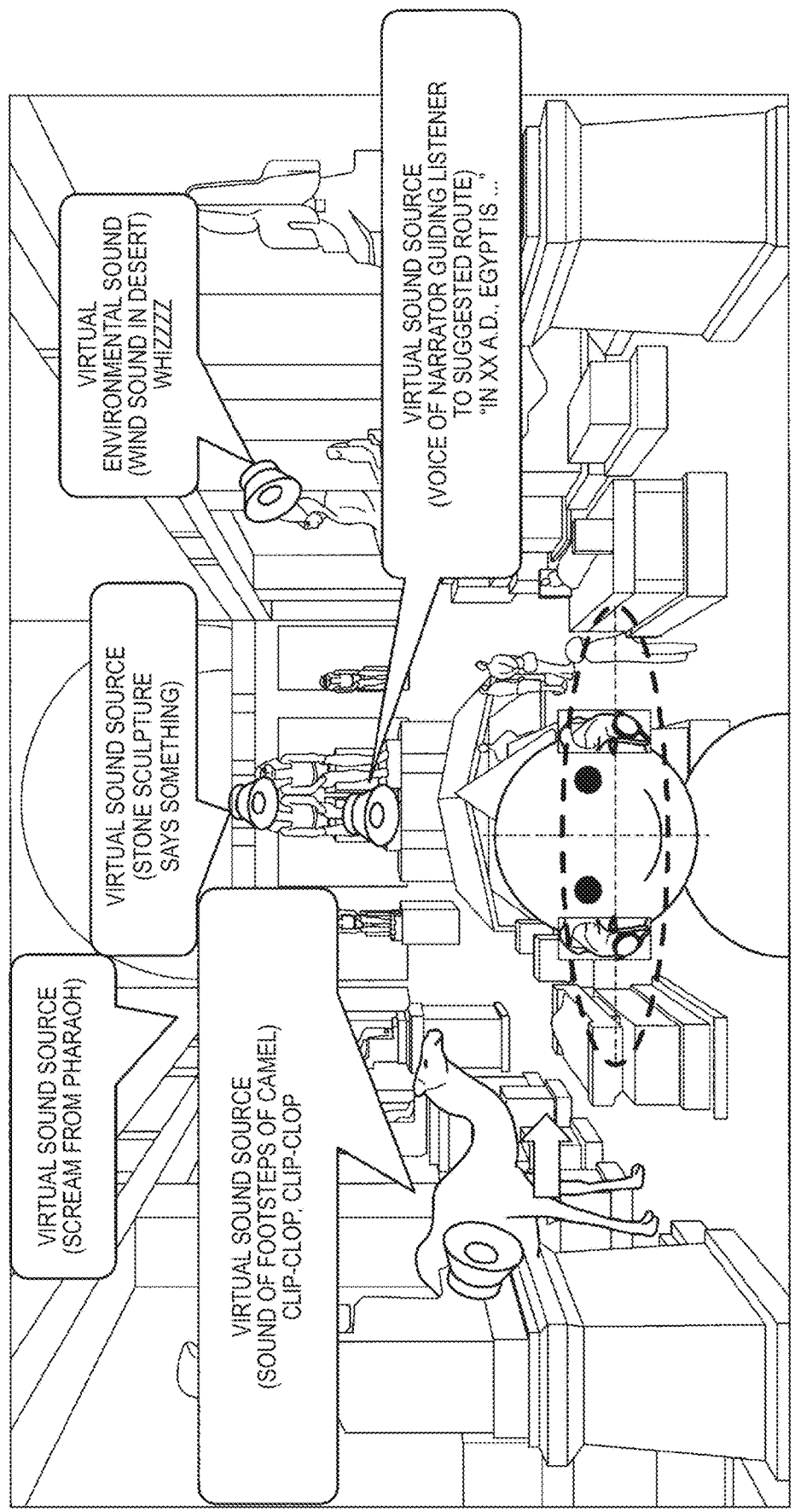
FIG. 29 is a schematic diagram illustrating an example of applying the sound output device according to the embodiment to a system of providing a plurality of virtual sound sources in a museum.

In the past, voice of an instructor, navigation voice, explanatory sub-voice, or the like is targeted as a single dry source sound source. However, when treating it as a 'single object', it is possible to extend and apply the system according to the embodiment of the present disclosure such that a plurality of objects are simultaneously reproduced as sound sources. For example, as illustrated in FIG. 29, it is possible to apply the present disclosure to a system for providing a plurality of virtual sound sources in a museum. In this case, the sensors 416 and the GPS 466 detect information such as a direction of a head or a location of a listener in an exhibition room, the information is analyzed by using another system (including a system in a cloud), and sound corresponding to a result of the analysis is transmitted to the sound output device 100. Therefore, it is possible to construct an exhibit guide system by using virtual sound sources (virtual speakers 900). For example, in the example illustrated in FIG. 29, when a user wearing the sound output device 100 is standing in front of a stone sculpture in the center, the GPS 446 transmits location information to the sound delivery device 750, and sound corresponding to the location (in this case, it is assumed that the stone sculpture says something) is transmitted to the sound output device 100 and provided to the user. In a similar way, as illustrated in FIG. 29, when the user wearing the sound output device 100 is standing at a specific location, sound is provided to the user such as 'wind sound in a desert', 'scream from Pharaoh', 'sound of footsteps of a camel', 'voice of a narrator guiding the user to a suggested route', or the like.

For example, when this system is applied to all users in an exhibition hall, it is possible for all the users to experience existence of a sound source (virtual speaker 900) in the same sound image location while having conversation with each other, share the existence of the virtual sound image, and enjoy mixture of a real world and virtual sound sources. Of course, the sound is dedicated to each individual. Therefore, it is possible to reproduce sound in a language corresponding to each individual. In contrast to speakers, a plurality of users who speaks different languages form each other can enjoy the same content.

Note that, it is preferable to prepare prerecorded explanatory voice although players do a show (such as playing music, singing a song, doing a play, or the like) in real time. In general, explanatory content based on average show progress time is created in advance, and an operator changes a speed of a sequence to fast or slow in view of actual progress speed of the show. Accordingly, it is possible to optimally adjust the explanatory voice.

Next, a system in which provision of voice from the sound output device 100 and provision of voice from a stereo sound source or the like are combined will be described. For example, it is possible to express a virtual speaker by using headphones while targeting on stereo sound sources such as music. In this case, it is possible to localize a sound image as if the virtual speakers 900 are at virtual sound image locations.

Figure 30:
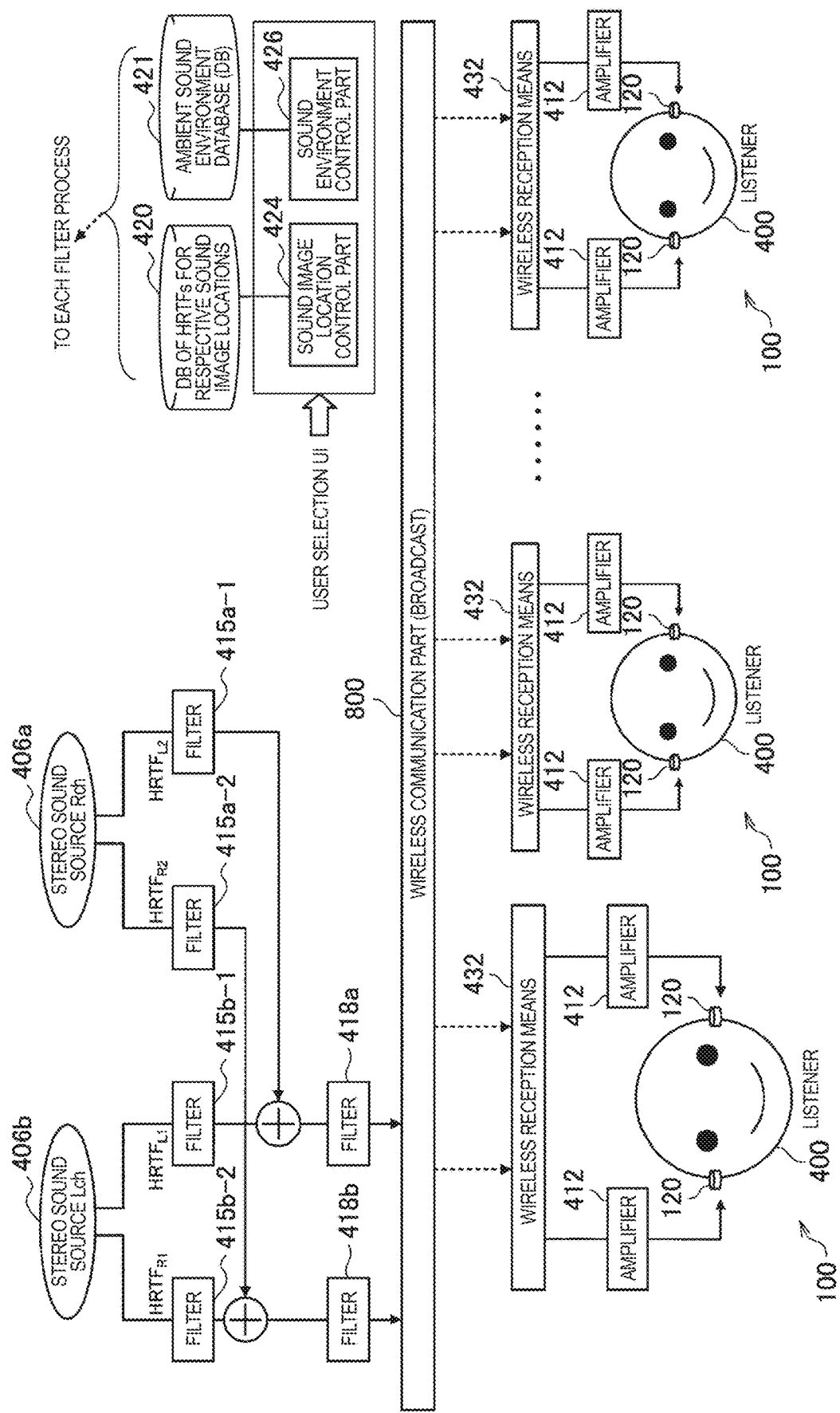
FIG. 30 is a schematic diagram illustrating a system by which a plurality of users can simultaneously enjoy music from virtual speakers by using a wireless communication part.
Figure 31:
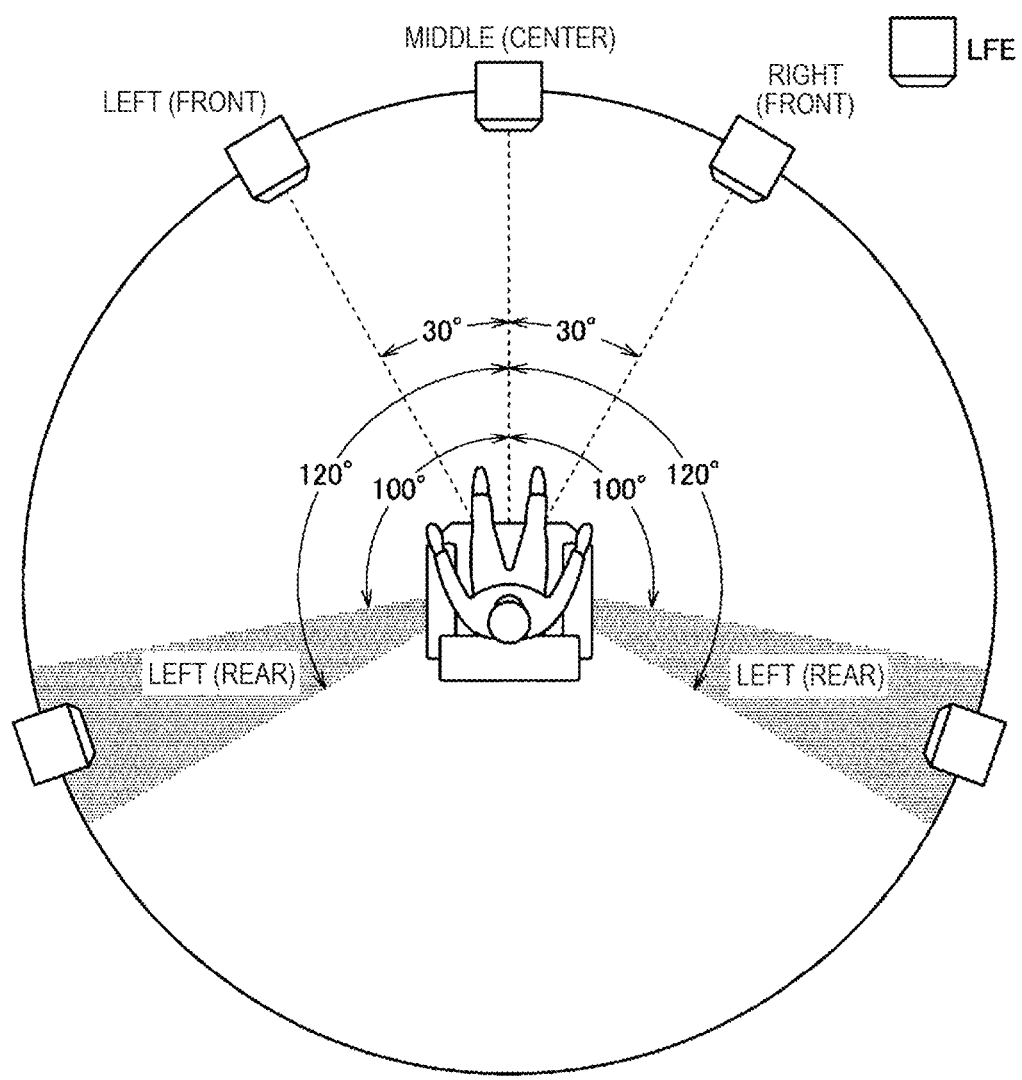
FIG. 31 is a schematic diagram illustrating a speaker arrangement example with regard to 5.1 ch multichannel content.

For example, in the case of building a system as illustrated in FIG. 30, it is possible for a plurality of users to simultaneously enjoy music from virtual speakers by using a wireless communication part 800. It is also possible to apply this system to multichannel content recorded in a Blu-Ray disc, a DVD disc, or the like. For example, 5.1 ch multichannel content is configured on the assumption of arrangement of speakers as illustrated in FIG. 31. In a way similar to the stereo sound sources, it is possible to enjoy such 5.1 ch multichannel content through headphones by setting virtual speakers corresponding to the locations of the respective speakers. Note that, many virtual surround products using such a principle and headphones have already been a commercial reality as products related to home cinema for reproducing all speaker channels subjected to signal processing in headphones.

Figure 32:
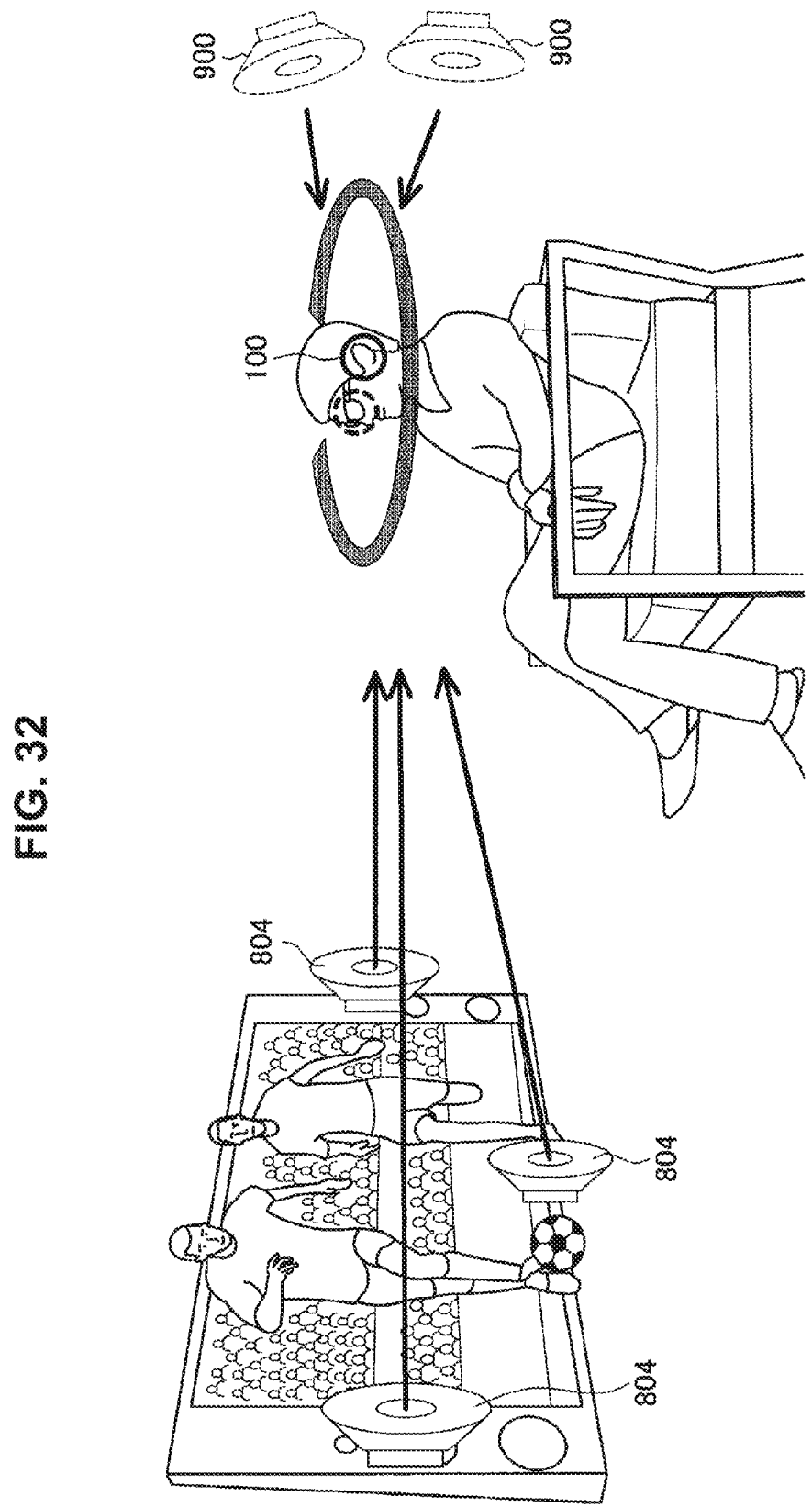
FIG. 32 is a schematic diagram illustrating an example of using actual speakers of a television for sound from the front, and using a sound output device for surround sound from the back.

However, in the embodiment according to the present disclosure, as illustrated in FIG. 32, actual speakers of a television are used for sound from the front, and virtual speakers 900 whose sound images are localized by using the sound output device 100 are used for surround sound from the back. In this case, it is possible for the large speakers in the front to reproduce bass sound, and it is not necessary to install surround speakers since the sound output device 100 is used instead of surround speakers in the back. Therefore, even in the case of a small room in which it is difficult to install surround speakers, it is possible to obtain surround sound effects.

Figure 33:
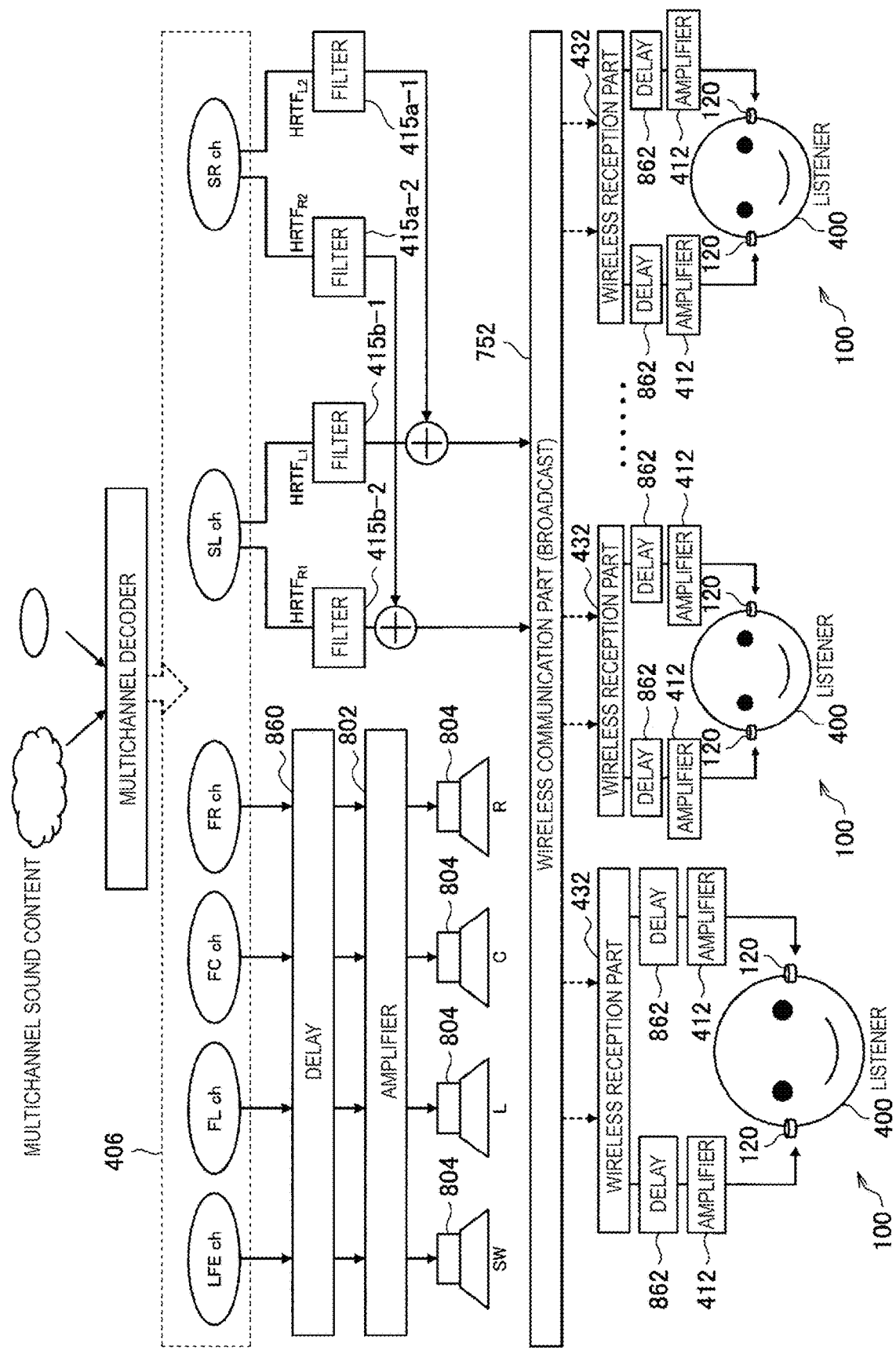
FIG. 33 is a schematic diagram illustrating a configuration of the system illustrated in FIG. 32.
Figure 34:
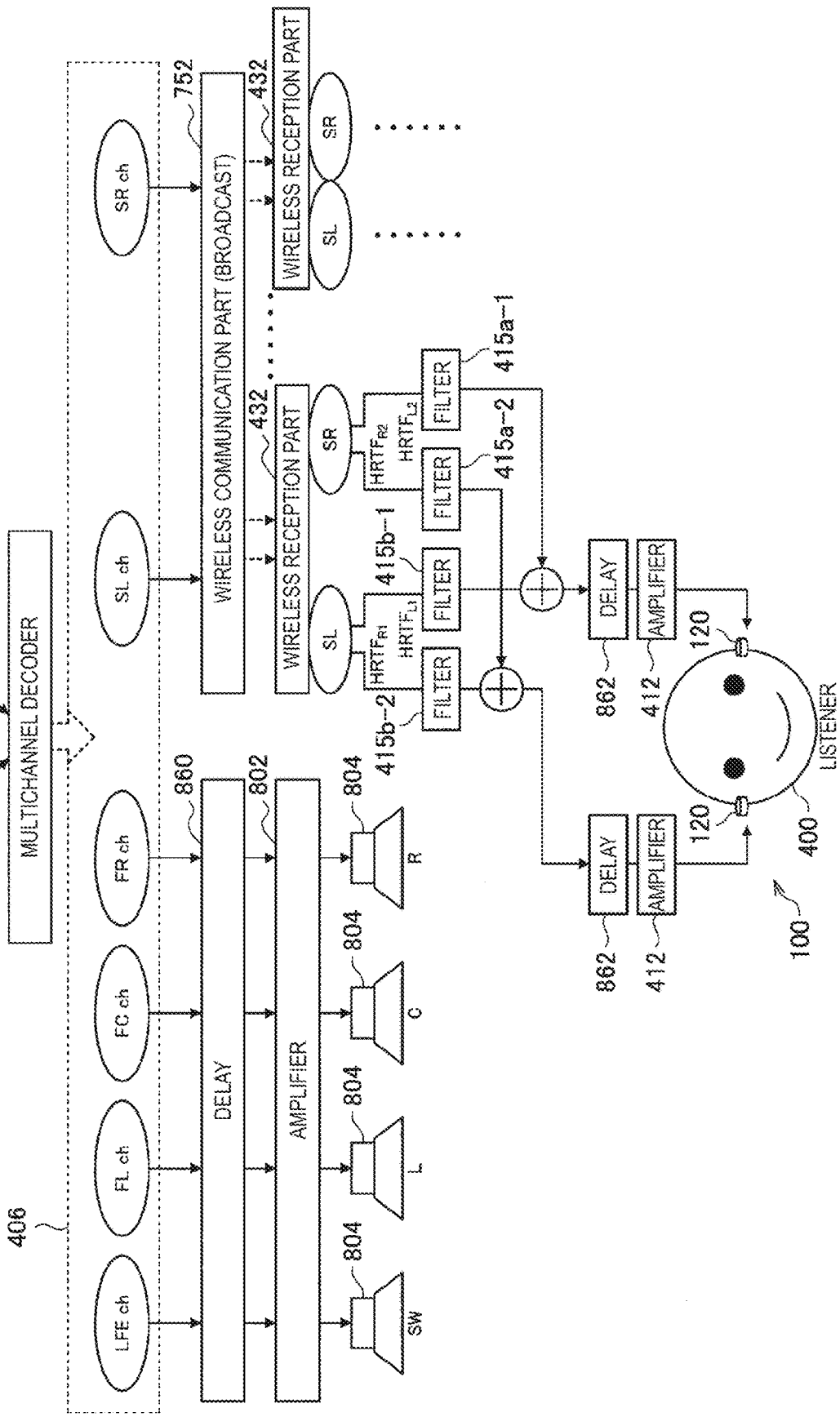
FIG. 34 is a schematic diagram illustrating a configuration of the system illustrated in FIG. 32.

FIG. 33 and FIG. 34 are schematic diagrams illustrating configurations of the system illustrated in FIG. 32. In FIG. 33 and FIG. 34, multichannel sound content (cloud or package) including multichannel sound data is broken down into respective channel sources of 5.1 ch through the sound source 406 (virtual surround device), and sound other than the SL and SR that are rear surround channels is output from real speakers 804 through an amplifier 802. Note that, the speakers 804 correspond to the 'sound output part' of the present disclosure.

In FIG. 33, the filters 415a-1, 415a-2, 415b-1, and 415b-2 perform HRTF filtering processes on sound data for the rear surround channels SL and SR before wireless transmission to the sound output device 100. Therefore, in a way similar to FIG. 27, the sound output device 100 on a reception side does not have a filter processing mechanism, and the simple structure can be achieved. For example, it is possible to implement the sound output device 100 by a general Bluetooth headset or the like.

On the other hand, the system illustrated in FIG. 34 transmits sound sources (SL and SR) whose sound images are to be virtually localized, to the sound output device 100 without any change, and the sound output device 100 performs filtering processes through the filters 415 based on HRTFs. In this case, it is possible to perform processes through the filters 415 by using HRTFs dedicated to each user, in comparison with FIG. 33. In addition, by combining with the sensor 416 such as a gyro sensor, it is possible to dynamically control sound image locations in response to movement of the head in a way similar to FIG. 11. This enables highly functional application.

Note that, in FIG. 33 and FIG. 34, delay parts 860 and 862 are built on SL and SR sides and in other routes of sound sources. In FIG. 33 and FIG. 34, the delay part 860 is provided between the sound source 406 and the amplifier 802. In addition, in FIG. 33, the delay parts 862 are provided between the wireless communication part 432 and the amplifiers 412.

Figure 35:
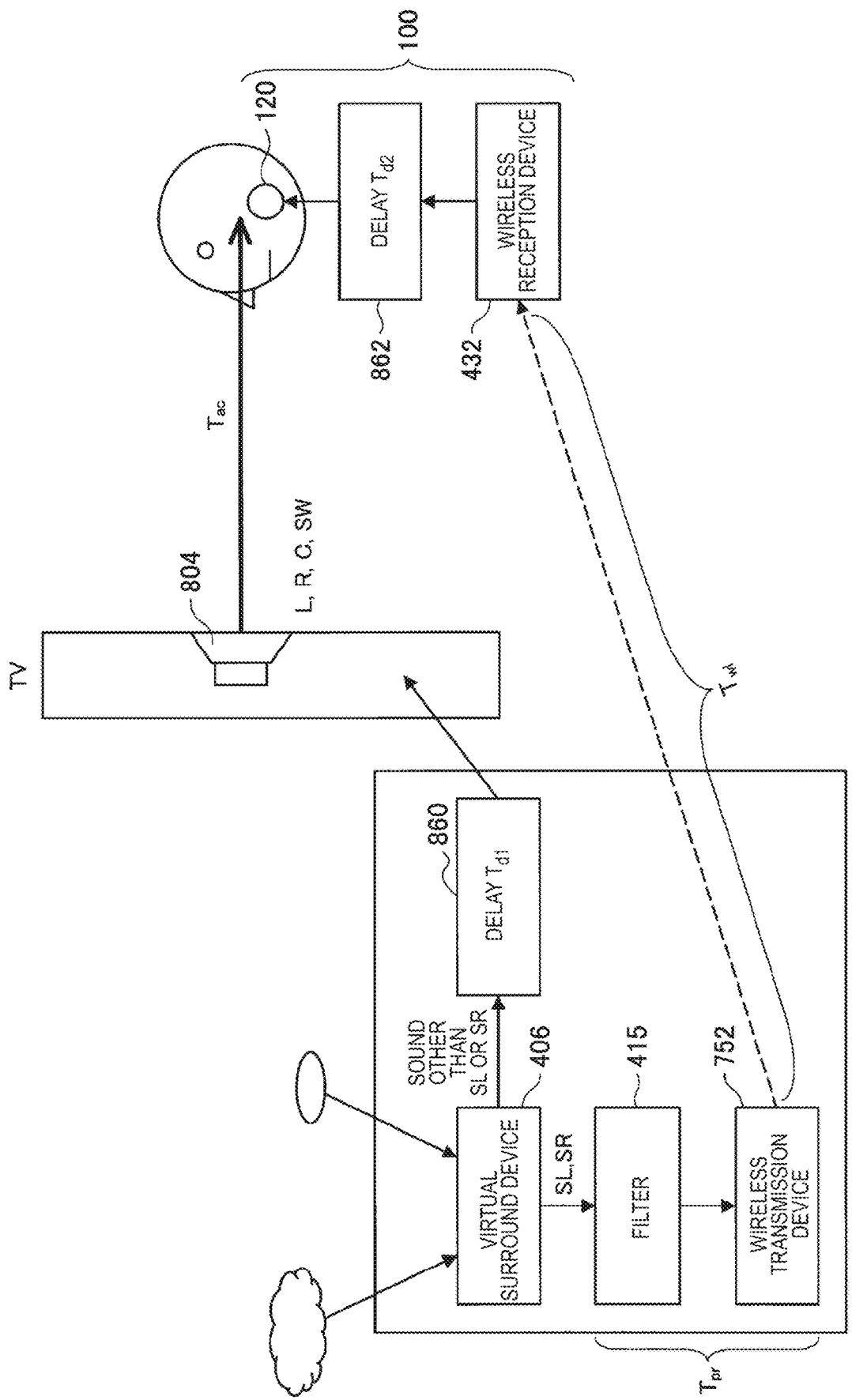
FIG. 35 is an explanatory diagram of the system illustrated in FIG. 33, where Tpr represents a processing time of an HRTF or sound environment filtering, Twl representing a time spent on wireless transmission through Bluetooth (registered trademark) or the like, and Tac represents a time spent on propagation of sound from a speaker to an ear of a user.

The delay parts 860 and 862 are provided for synchronizing sound from real speakers 804 and sound from the sound output device 100 during reproduction between multi channels. FIG. 35 is a schematic diagram illustrating time Tac between output of sound from the sound source 406 and arrival of the sound to a user via the real speakers 804, and time between output of sound from the sound source 406 and arrival of the sound to a user via the sound output device 100.

In FIG. 35, Tpr represents a processing time of an HRTF or sound environment filtering, Twl representing a time spent on wireless transmission through Bluetooth (registered trademark) or the like, and Tac represents a time spent on direct propagation of sound from the speaker 804 to an ear of a user, with regard to the system illustrated in FIG. 33. Here, when Td1 and Td2 are adjusted such that an equation listed below is satisfied, it is possible to synchronize sound from the real speaker 804 and sound from the sound output device 100, and a desirable system can be obtained.

$$Td1+Tac=Td2+Tpr+Tw1$$

In general, video is also reproduced simultaneously with sound from the real speaker 804. Therefore, it is desirable to suppress values in the left-hand side and the right-hand side in the above-listed equation to be minimized. For example, on the assumption that Bluetooth (registered trademark) is used as the wireless communication of the system in FIG. 33 and a hearing distance of a user (distance from the real speaker 804 to the user) is 1 m, Tw1 is about 250 ms on the basis of A2DP, and Tac is about 3 ms (340 m/s in speed of sound). On the assumption that Tpr is zero, Td1=247 ms, and Td2=0[s] can be obtained. In general, delay in the wireless system is larger. Therefore, the sound output device 100 does not have to include the delay part 862.

Figure 36:
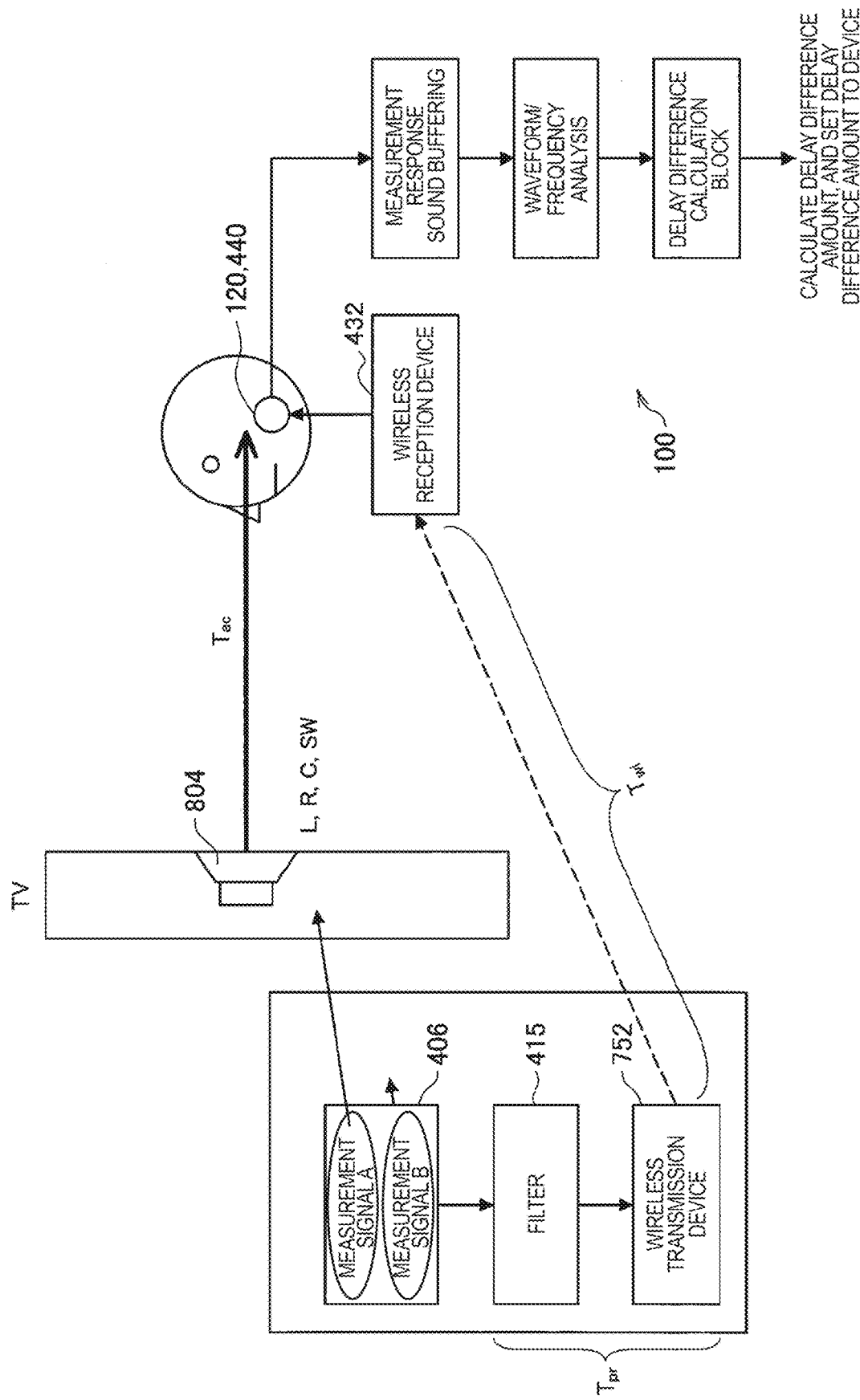
FIG. 36 is a schematic diagram illustrating a case of simultaneously reproducing measurement signals A and B simultaneously through two reproduction routes and measuring a delay value.

The above described numerical values may be set in advance in a device or equipment or may be manually set by a user on the assumption of a usage environment for the user. On the other hand, it is also possible to automatically measure and set delay values. FIG. 36 illustrates a case of simultaneously reproducing measurement signals A and B simultaneously through two reproduction routes (reproduction from the real speaker 804 and reproduction form the sound output device 100) and measuring a delay value. With reference to FIG. 36, the microphone 440 is installed in the sound output device 100, and it is possible to calculate a delay amount by analyzing waveforms and frequency processes of measurement signal responses. Specifically, response signals of the measurement signal A and the measurement signal B are acquired from the microphone 440 and the wireless communication part 432, the response signals are buffered, frequency analysis is performed on waveforms, and a delay difference is calculated. The numerical value of the delay difference is returned from the wireless communication part 432 to the sound source 406 side via the wireless communication part 752. Therefore, it is possible to set a delay amount of the delay part 860.

Figure 37:
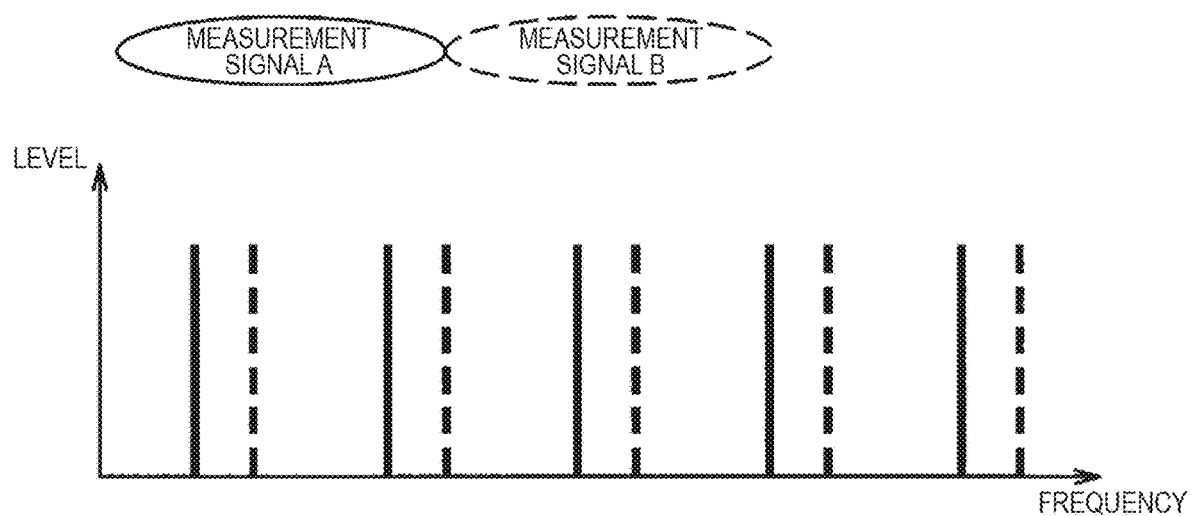
FIG. 37 is a schematic diagram illustrating wave forms with different frequency components, as an example of measurement signals A and B that are reproduced simultaneously.

As an example of the measurement signal A and the measurement signal B that are reproduced simultaneously, for example, it is possible to separately perform analysis by using FFT, as long as they have waveforms with different frequency components as illustrated in FIG. 37. For example, it is possible to calculate time difference according to difference between the route of the measurement signal A and the route of the measurement signal B by observing the frequency responses including time elapsed from start of the measurement. In this case, it is also possible to shape signal sound into a musical scale and reproduce the sound as a melody (music) so as not to cause the user to feel uncomfortable with respect to the measurement signals.

Note that, in FIG. 36, the delay amount is calculated in the sound output device 100. However, it is also possible to compress measurement response signals themselves or information obtained from the measurement response signals, transmit them to the system on the sound source 406 side or another system, and calculate delay time in a place with sufficient computation resource. Note that, although not illustrated, in the case where sound delay is too large in view of sound and video synchronization (lip sync), it is possible to achieve the sound and video synchronization by providing video delay device (frame buffer) on the video side.

In addition, as illustrated in FIG. 38, the technique according to the embodiment of the present disclosure is also effective in movie theaters. For example, to effectively reproduce content, the sound output device 100 reproduces sound around each user and whispering voice into his/her ear, while using a rich reproduction system in the movie theater to reproduce front sound or bass sound. Therefore, it is possible to provide great sound effects. For example, sound of a helicopter hovering above a person in a movie is provided from the sound output device 100 instead of speakers in a movie theater. Therefore, each listener can obtain hearing sensation as if the helicopter is hovering above himself/herself. FIG. 38 illustrates four independent object sound sources (Obj1 to Obj4) to show separate reproduction of the object sound sources included in movie content, rather than showing reproduction from virtual speakers. In this case, the four object sound sources are localized at locations close behind each listener. Accordingly, it is possible for each person to simultaneously feel object sound sources localized at locations behind him/her regardless of a location of his/her seat in the movie theater, and new reproduction effects can be obtained. With regard to difference between the channel and the object, the channel is interpreted as a 'sound source that does not move from an initial location', and the object is interpreted as a 'sound source capable of moving over time'. In general, the object is present as meta information in which the object is additionally associated with a location, information regarding movement (such as speed and acceleration), and the like. In some sound formats of recent movies, both object sound sources (dry sources) and meta information are recorded such that they are added to content for respective channels corresponding to respective reproduction speakers and optimally rendered in accordance with a reproduction environment. In a general process, the object sound sources are rendered in accordance with a reproduction environment, added with channel information, and then reproduced from respective speakers.

Figure 39:
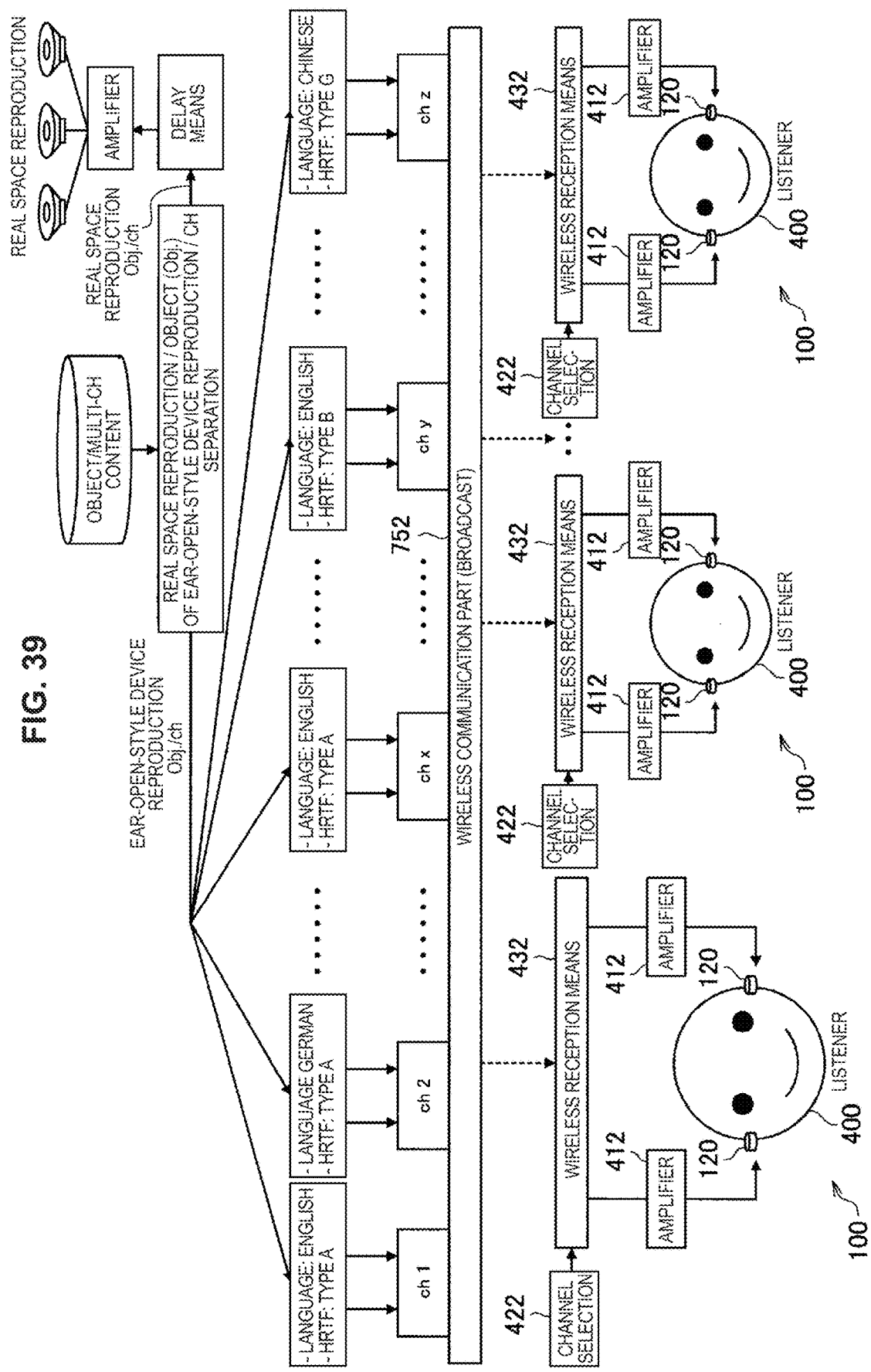
FIG. 39 is a schematic diagram illustrating an example of separating channels and objects serving as reproduction targets of a sound output device from channels and objects to be reproduced in a real speaker in the case where content includes the channels and objects serving as the reproduction targets of the sound output device.

In addition, in a way similar to FIG. 28, this system can accommodate many different languages. Therefore, when dialogue parts (lines) in movie or TV content are treated as objects to be transmitted to the sound output device 100, it is possible for each person to select his/her native language in the same movie theater. As illustrated in FIG. 39, reproduction targets of the sound output device 100 are separated from channels and objects to be reproduced in the real speakers 804 in the case where content includes channels and objects serving as the reproduction targets of the sound output device 100. The system according to the embodiment is built such that, in the case of the channel, as described above, the sound source desired to be reproduced by the sound output device 100 is subjected to a process of placing the sound source as a virtual speaker whose location is fixed, and in the case of the object, a virtual sound image is localized (rendered) appropriately in accordance with description of a localization location of the object, and they are mixed into two channels and transmitted in a wireless manner. As illustrated in FIG. 39, it may be possible for a user to select HRTFs from a plurality of types of HRTFs to match the HRTFs to difference (compatibility) between individuals, in a way similar to FIG. 28. Note that, even in the case of one content, synchronization reproduction is achieved such that the delay part 810 is provided on the real space side and a delay process of an appropriate amount of time is interposed to synchronize sound reproduced from the real speakers 804 and sound reproduced from the sound output device 100 as described above.

Note that, in FIG. 37, a plurality of sine waves with different frequencies is used to measure a delay time. This method uses a time-stretched pulse (TSP). Adjustment can be performed after measurement of delay to the microphone 440 installed in the sound output device 100. In addition, a wireless reproduction signal to the sound output device 100 does not have to pass through the microphone 440. It is possible to measure the signal as an electric signal. What is necessary is delay in wireless propagation or a wireless-related system. Therefore, reproduction is not always necessary at this time. In the case of an electric signal, it is possible to mute an amplifier on the sound output device 100 side.

Note that, with regard to measurement of delay between the real speaker 804 and the microphone 440 of the sound output device 100, technologies described in JP 4285457B, JP 4210859B, JP 4407541B, and JP 4466453B are known as automatic sound field correction technologies for multichannel speakers. For example, when such technologies are applied to the sound output device 100, it is possible to measure respective distances from a plurality of speakers (three speakers SP-L, C, and R) by arranging microphones 440 on respective parts corresponding to ears in the sound output device 100. It is possible to perform measurement itself sequentially by using the TSP, or it is possible to perform measurement simultaneously in the respective speakers by using independent sine waves in a way similar to FIG. 37. Accordingly, it is possible to obtain a distance from a speaker system including the real speakers 804 and an angle with respect to a user. In general, an angle between the sound output device 100 and the speaker system including the real speakers 804 is unknown. Therefore, locations of right and left rear virtual speakers of the sound output device 100 are considered to be set on right and left side behind the head of the user. By using the microphone 440, it is possible to recognize the distance from the speaker system and the angle with respect to the user. Therefore, it is also possible to create virtual speakers at locations corresponding to locations and angles of speakers and a user. In this case, in a way similar to the real speakers in the front, it is also possible to fix the locations of rear virtual speakers at specific locations in the room by attaching the sensors 416 such as gyro sensors to the sound output device 100, despite of rotations of the head.

In addition, as an example of reproduction for a user, it is possible to use sound including such a delay measurable component, as a 'device start-up sound'. In addition, in the case of the movie theater, the measurement signal may be mixed in a 'theater etiquette PSA' or an advertisement before movie. Therefore, it is possible to measure delay time of each user without letting the users recognize the measurement.

As described above, according to the embodiment, it is possible to localize sound images at desired location by adjusting head-related transfer functions in the case where the sound output device 100 illustrated in FIG. 1 provides sound to listeners. Therefore, sound directly entering into his/her ears is not interrupted, and it is possible for the user to clearly distinguish the sound directly entering into his/her ears and sound provided from the sound environment device 100 such that the listener does not feel strangeness. Therefore, it is possible for the sound output device 100 to provide various kinds of information such as navigation information to listeners without interrupting the sound directly entering into their ears The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

A sound output device including:

a sound acquisition part configured to acquire sound to be output to the other end of a sound guide part, one end of which is arranged near an entrance of an ear canal of a listener, the sound guide part having a hollow structure; and a head-related transfer function adjustment part configured to adjust a head-related transfer function of sound captured by the sound guide part.

(2)

The sound output device according to (1), further including a sound environment adjustment part configured to adjust a sound environment of sound captured by the sound guide part.

(3)

The sound output device according to (1), in which the head-related transfer function adjustment part changes the head-related transfer function such that a sound image of the sound is localized at a place different from a place of ambient sound directly entering an ear of a listener.

(4)

The sound output device according to (1), in which the head-related transfer function adjustment part changes the head-related transfer function such that a sound image of the sound is localized above a head of the listener or near a foot of the listener.

(5)

The sound output device according to (1), in which the head-related transfer function adjustment part adjusts the head-related transfer function on a basis of operation performed by a listener.

(6)

The sound output device according to (2), in which the sound environment adjustment part adjusts the sound environment on a basis of operation performed by a listener.

(7)

The sound output device according to (2), in which the sound environment adjustment part adjusts the sound environment on a basis of sound information of an ambient environment of the listener.

(8)

The sound output device according to (7), in which the sound environment adjustment part adjusts the sound environment on a basis of a result of separating the sound information of the ambient environment into human voice and environmental sound other than the human voice.

(9)

The sound output device according to (2), in which the sound environment adjustment part acquires a result of analyzing sound information of an ambient environment of the listener from another device, and adjusts the sound environment.

(10)

The sound output device according to (2), in which the sound environment adjustment part adjusts the sound environment on a basis of location information of a listener.

(11)

The sound output device according to (1), in which the head-related transfer function adjustment part adjusts the head-related transfer function on a basis of a direction of a head of a listener.

(12)

The sound output device according to (2), in which the head-related transfer function adjustment part adjusts a head-related transfer function such that a sound image location is a constant location regardless of a direction of a head of a listener.

(13)
The sound output device according to (1), including
a sound output part configured to output sound to be transmitted to an ear of the listener without passing through the sound guide part.

(14)
The sound output device according to (13),
in which one of sound to be output to the sound guide part and sound to be transmitted to an ear of the listener without passing through the sound guide part is delayed.

(15)
The sound output device according to (13), including
a delay part configured to delay sound to be transmitted to an ear of the listener without passing through the sound guide part in comparison with sound to be output to the sound guide part.

(16)
The sound output device according to (1), including
a location information acquisition part configured to acquire locational information of a listener,
in which the sound acquisition part acquires navigation information based on the location information.

(17)
The sound output device according to (1),
wherein the sound acquisition part acquires speech of the listener or voice for giving an instruction on movement of the listener.

(18)
The sound output device according to (1),
in which the sound acquisition part acquires guidance information for explaining any event visually recognized by the listener in a language designated by the listener from among a plurality of languages.

(19)
A sound generation method including:
acquiring sound to be output to the other end of a sound guide part, one end of which is arranged near an entrance of an ear canal of a listener, the sound guide part having a hollow structure; and
adjusting a head-related transfer function of sound captured by the sound guide part.

(20)
A program causing a computer to function as:
a means for acquiring sound to be output to the other end of a sound guide part, one end of which is arranged near an entrance of an ear canal of a listener, the sound guide part having a hollow structure; and
a means for adjusting a head-related transfer function of sound captured by the sound guide part.

REFERENCE SIGNS LIST 100 sound output device
415, 418 filter
416 sensor (acceleration sensor and gyro sensor)
422 UI
424 sound image location control part
426 sound environment control part
440 microphone
442 sound environment recognition control part
446 GPS
804 speaker
860 delay part

The invention claimed is:
1. A sound output device comprising:
a support configured to fit the sound output device to and support the sound device from an intertragic notch of an ear of a listener without hanging from a top of the ear; and
at least one processor configured to:
acquire sound to be output to a first end of a sound guide; and
adjust a head-related transfer function of sound captured by the sound guide,
wherein the sound guide comprises a second end that is closer to the intertragic notch than the first end of the sound guide is,
wherein the support is configured to suspend the first end of the sound guide behind a lobe of the ear,
wherein the sound guide has a hollow structure, and
wherein the hollow structure of the sound guide curves around an axis parallel to an ear canal of the listener.

2. The sound output device according to claim 1, wherein the at least one processor is further configured to:
adjust a sound environment of sound captured by the sound guide.

3. The sound output device according to claim 1,
wherein the head-related transfer function is adjusted such that a location of sound source of the sound is localized at a place different from a place of ambient sound directly entering an ear of a listener.

4. The sound output device according to claim 1,
wherein the head-related transfer function is adjusted such that a location of sound image of the sound is localized above a head of the listener or near a foot of the listener.

5. The sound output device according to claim 1,
wherein the head-related transfer function is adjusted on a basis of operation performed by a listener.

6. The sound output device according to claim 2,
wherein the sound environment is adjusted on a basis of operation performed by a listener.

7. The sound output device according to claim 2,
wherein the sound environment is adjusted on a basis of sound information of an ambient environment of the listener.

8. The sound output device according to claim 7,
wherein the sound environment is adjusted on a basis of a result of separating the sound information of the ambient environment into human voice and environmental sound other than the human voice.

9. The sound output device according to claim 2,
wherein the at least one processor is configured to acquire a result of analyzing sound information of an ambient environment of the listener from another device, and adjust the sound environment.

10. The sound output device according to claim 2,
wherein the sound environment is adjusted on a basis of location information of a listener.

11. The sound output device according to claim 1,
wherein the head-related transfer function is adjusted on a basis of a direction of a head of a listener.

12. The sound output device according to claim 2,
wherein the head-related transfer function is adjusted such that a sound image location is a constant location regardless of a direction of a head of a listener.

13. The sound output device according to claim 1, comprising
a sound output configured to output sound to be transmitted to an ear of the listener without passing through the sound guide.

14. The sound output device according to claim 13, wherein one of sound to be output to the sound guide and sound to be transmitted to an ear of the listener without passing through the sound guide is delayed.

15. The sound output device according to claim 13, wherein the at least one processor is configured to delay sound to be transmitted to an ear of the listener without passing through the sound guide in comparison with sound to be output to the sound guide.

16. The sound output device according to claim 1, comprising
wherein the at least one processor is configured to acquire location information of a listener, and acquire navigation information based on the location information.

17. The sound output device according to claim 1, wherein the at least one processor is configured to acquire speech of the listener or voice for giving an instruction on movement of the listener.

18. The sound output device according to claim 1, wherein the at least one processor is configured to acquire guidance information for explaining any event visually recognized by the listener in a language designated by the listener from among a plurality of languages.

19. A sound generation method comprising:
acquiring sound to be output to a first end of a sound guide of a sound output device, wherein the sound guide is configured to fit the sound output device to and support the sound output device from an intertragic notch of an ear of a listener without hanging from a top of the ear and to suspend the first end of the sound guide behind a lobe of the ear; and
adjusting a head-related transfer function of sound captured by the sound guide,
wherein the sound guide comprises a second end that is closer to the intertragic notch than the first end of the sound guide is,
wherein the sound guide has a hollow structure, and
wherein the hollow structure of the sound guide curves around an axis parallel to an ear canal of the listener.

20. At least one non-transitory computer-readable storage medium encoded with executable instructions that, when executed by at least one processor, cause the at least one processor to perform a method comprising:
acquiring sound to be output to a first end of a sound guide of a sound output device, wherein the sound guide is configured to fit the sound output device to and support the sound output device from an intertragic notch of an ear of a listener without hanging from a top of the ear and to suspend the first end of the sound guide behind a lobe of the ear; and
adjusting a head-related transfer function of sound captured by the sound guide,
wherein the sound guide comprises a second end that is closer to the intertragic notch than the first end of the sound guide is,
wherein the sound guide has a hollow structure, and
wherein the hollow structure of the sound guide curves around an axis parallel to an ear canal of the listener.

* * * * *